US012561484B2

(12) United States Patent
Kovach et al.

(10) Patent No.: US 12,561,484 B2
(45) Date of Patent: Feb. 24, 2026

(54) SYSTEMS AND METHODS FOR DATA AND IDENTITY VALIDATION AND INTEGRITY-CHECK BASED ON ARTIFICIAL INTELLIGENCE AND/OR BLOCKCHAIN SYSTEMS

(71) Applicant: NotaryBloc LLC, Carrollton, TX (US)

(72) Inventors: Daniel Kovach, Tampa, FL (US); Juan Vasquez, Carrollton, TX (US)

(73) Assignee: NotaryBloc LLC, Carrollton, TX (US)

( * ) Notice: Subject to any disclaimer, the term of this patent is extended or adjusted under 35 U.S.C. 154(b) by 100 days.

(21) Appl. No.: 18/433,208

(22) Filed: Feb. 5, 2024

(65) Prior Publication Data

US 2024/0265147 A1     Aug. 8, 2024

Related U.S. Application Data

(60) Provisional application No. 63/483,053, filed on Feb. 3, 2023.

(51) Int. Cl.
 *G06F 21/64* (2013.01)
 *G06F 21/32* (2013.01)
(52) U.S. Cl.
 CPC .............. *G06F 21/64* (2013.01); *G06F 21/32* (2013.01)
(58) Field of Classification Search
 CPC ................................ G06F 21/64; G06F 21/32
 See application file for complete search history.

(56) References Cited

U.S. PATENT DOCUMENTS

| | | | |
|---|---|---|---|
| 2013/0019289 A1* | 1/2013 | Gonser | H04L 63/08 |
| | | | 726/6 |
| 2016/0162729 A1* | 6/2016 | Hagen | G06V 40/67 |
| | | | 382/118 |
| 2020/0169415 A1* | 5/2020 | Schmidt | H04L 9/3247 |
| 2020/0295949 A1* | 9/2020 | Ding | H04L 9/0637 |
| 2021/0281421 A1* | 9/2021 | Semenovskiy | G06Q 20/3276 |

FOREIGN PATENT DOCUMENTS

CN          107680013 A * 2/2018 ........... G06Q 50/188

* cited by examiner

*Primary Examiner* — Trong H Nguyen
(74) *Attorney, Agent, or Firm* — Whitaker Chalk Swindle & Schwartz PLLC; Juan Vasquez

(57) ABSTRACT
System and methods for validating and confirming the integrity of documents and for validating identity related to the documents based on artificial intelligence and/or blockchain systems. In embodiments, a system implements validation controls to validate and/or confirm the integrity of documents to safeguard against document tampering, ensuring the integrity of the document remains intact throughout the signing process and afterwards. In addition, in embodiments, a system with enhanced functionality implements advanced verification and/or validation mechanisms to ensure the identity of the signatory parties of a document accurately reflects the authorized individual(s). The advantageous result of a system implemented in accordance with the present disclosure is a system that is able to address the critical gaps of current existing digital signature systems and in doing so, the present disclosure enables a system to significantly bolster the security, reliability, and trustworthiness of digital document signing and management.

18 Claims, 26 Drawing Sheets

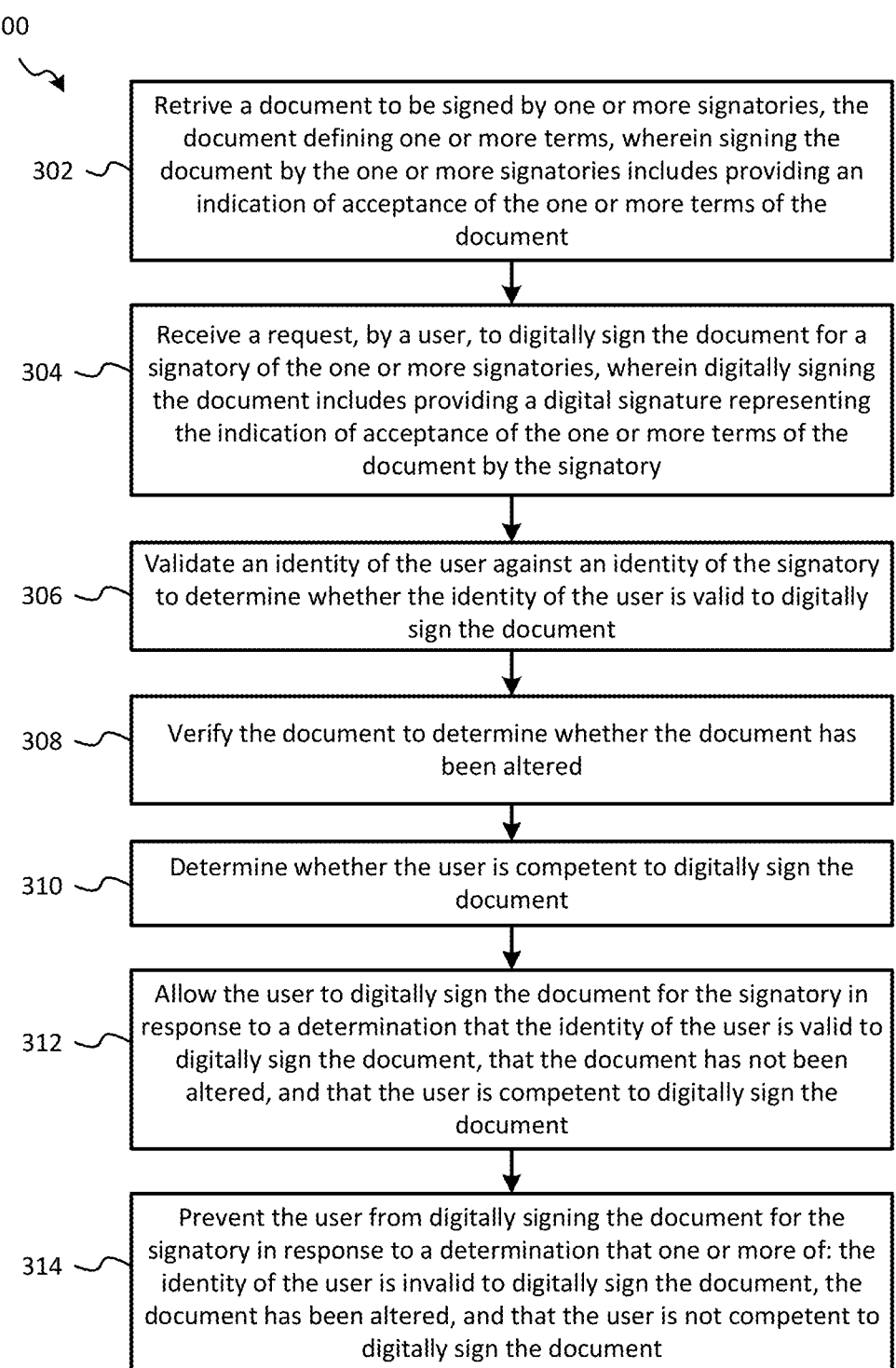

300

302 — Retrive a document to be signed by one or more signatories, the document defining one or more terms, wherein signing the document by the one or more signatories includes providing an indication of acceptance of the one or more terms of the document 304 — Receive a request, by a user, to digitally sign the document for a signatory of the one or more signatories, wherein digitally signing the document includes providing a digital signature representing the indication of acceptance of the one or more terms of the document by the signatory 306 — Validate an identity of the user against an identity of the signatory to determine whether the identity of the user is valid to digitally sign the document 308 — Verify the document to determine whether the document has been altered 310 — Determine whether the user is competent to digitally sign the document 312 — Allow the user to digitally sign the document for the signatory in response to a determination that the identity of the user is valid to digitally sign the document, that the document has not been altered, and that the user is competent to digitally sign the document 314 — Prevent the user from digitally signing the document for the signatory in response to a determination that one or more of: the identity of the user is invalid to digitally sign the document, the document has been altered, and that the user is not competent to digitally sign the document

FIG. 3

SYSTEMS AND METHODS FOR DATA AND IDENTITY VALIDATION AND INTEGRITY-CHECK BASED ON ARTIFICIAL INTELLIGENCE AND/OR BLOCKCHAIN SYSTEMS

CROSS-REFERENCE TO RELATED APPLICATIONS

The present application claims priority to U.S. Prov. App. Ser. No. 63/483,053, filed on Feb. 3, 2022, titled "CONTRACTS ON THE BLOCKCHAIN," the entirety of which is incorporated herein by reference for all purposes.

TECHNICAL FIELD

The present disclosure relates generally to digital signature systems, and more particularly to systems and methods for validating and confirming the integrity of a digital signature transaction based on based on AI and/or blockchain systems.

BACKGROUND

In the realm of digital transactions and document management, existing systems for digitally signing documents have increasingly become a staple in both personal and professional settings. These digital signature systems are designed to facilitate the authentication and execution of documents electronically, providing a semblance of efficiency and convenience not available with traditional paper-based processes. However, despite their advancements and widespread adoption, these systems inherently lack robust mechanisms to conclusively verify the identity of the signatory. This gap in functionality raises significant security concerns, as the process of digitally signing a document does not inherently guarantee that the person signing the document is indeed the individual authorized to do so. The susceptibility of the signing process to interception or unauthorized access further exacerbates this issue. For instance, a signing link sent via email or other digital means could be intercepted or accessed by someone other than the intended recipient, allowing them to illegitimately sign the document without proper authorization.

Identity theft presents another glaring vulnerability within current digital signature systems. An identity thief could potentially sign a document, such as a credit card application or a legal agreement, under a false identity. This fraudulent act not only undermines the integrity of the digital signature but also poses significant financial and legal risks to the parties involved. The challenge of identity verification is not solely confined to digital systems; it extends to traditional notarized documents as well. Bad actors may forge notary stamps, creating an illusion of authenticity that can deceive document recipients and undermine the trustworthiness of the notarization process. This vulnerability highlights the limitations of current verification methods in providing a foolproof mechanism for ensuring the authenticity of both the signatory and the notarial endorsement.

Furthermore, existing digital signature systems often lack comprehensive safeguards against document tampering, leaving a critical loophole in document integrity. Once a document has been signed by one party, there is minimal assurance that it has not been altered or manipulated before being signed by another party. This deficiency poses a significant challenge in scenarios where the authenticity and unaltered state of a document are paramount. The absence of robust mechanisms to detect and prevent unauthorized modifications to a document after it has been signed compromises the security and reliability of the digital signing process.

SUMMARY

The present disclosure achieves technical advantages as systems and methods with enhanced digital signature functionality. In embodiments, a system implemented in accordance with the disclosure herein may include functionality for validating and confirming the integrity of a digital signature transaction based on based on AI and/or blockchain systems. For example, a system implemented in accordance with the disclosure herein may include functionality for validating and confirming the integrity of documents and for validating identity related to the documents based on artificial intelligence (AI) and/or blockchain systems. For example, in embodiments, the present disclosure provides for a system with enhanced functionality to implement validation controls to validate and/or confirm the integrity of documents to safeguard against document tampering, ensuring the integrity of the document remains intact throughout the signing process and afterwards. In addition, in embodiments, the present disclosure provides for a system with enhanced functionality to implement advanced verification and/or validation mechanisms to ensure the identity of the signatory parties of a document accurately reflects the authorized individual(s). The advantageous result of a system implemented in accordance with the present disclosure is a system that is able to address the critical gaps of current existing digital signature systems and in doing so, the present disclosure enables a system to significantly bolster the security, reliability, and trustworthiness of digital document signing and management.

In this manner, the present disclosure provides a technological solution that solves the technological problem associated with typical digital signature systems, such as a lack of features to validate and/or verify the identity of the signatory and to safeguard against document tampering, which decreases the value of digital signing functionality in conventional systems. The present disclosure provides a technological solution missing from conventional systems by providing verification and/or validation techniques that allow for effective validation and/or verification of the identity of a document signatory and effective validation of the integrity of the document being signed.

Accordingly, it will be appreciated that the technological solutions provided herein, and missing from conventional systems, are more than a mere application of a manual process to a computerized environment, but rather include functionality to implement a technical process to replace or supplement current manual solutions or non-existing solutions for digital signature systems. In doing so, the present disclosure goes well beyond a mere application the manual process to a computer. Accordingly, the claims herein necessarily provide a technological solution that overcomes a technological problem.

It is an object of the disclosure to provide a method of securely digitally signing a document. It is a further object of the disclosure to provide a system for securely digitally signing a document, and a computer-based tool for securely digitally signing a document. These and other objects are provided by the present disclosure.

In one particular embodiment, a method of securely digitally signing a document is provided. The method includes retrieving a document to be signed by one or more signatories. In embodiments, the document defining one or more terms, and signing the document by the one or more signatories includes providing an indication of acceptance of the one or more terms of the document. The method also includes receiving a request, by a user, to digitally sign the document for a signatory of the one or more signatories. In embodiments, digitally signing the document includes providing a digital signature representing the indication of acceptance of the one or more terms of the document by the signatory. The method further includes validating an identity of the user against an identity of the signatory to determine whether the identity of the user is valid to digitally sign the document, verifying the document to determine whether the document has been altered, determining whether the user is competent to digitally sign the document, allowing the user to digitally sign the document for the signatory in response to a determination that the identity of the user is valid to digitally sign the document, that the document has not been altered, and that the user is competent to digitally sign the document, and preventing the user from digitally signing the document for the signatory in response to a determination that one or more of: the identity of the user is invalid to digitally sign the document, the document has been altered, and that the user is not competent to digitally sign the document.

In another embodiment, a system for securely digitally signing a document is provided. The system comprises at least one processor and a memory operably coupled to the at least one processor and storing processor-readable code that, when executed by the at least one processor, is configured to perform operations. The operations include retrieving a document to be signed by one or more signatories. In embodiments, the document defining one or more terms, and signing the document by the one or more signatories includes providing an indication of acceptance of the one or more terms of the document. The operations also include receiving a request, by a user, to digitally sign the document for a signatory of the one or more signatories. In embodiments, digitally signing the document includes providing a digital signature representing the indication of acceptance of the one or more terms of the document by the signatory. The operations further include validating an identity of the user against an identity of the signatory to determine whether the identity of the user is valid to digitally sign the document, verifying the document to determine whether the document has been altered, determining whether the user is competent to digitally sign the document, allowing the user to digitally sign the document for the signatory in response to a determination that the identity of the user is valid to digitally sign the document, that the document has not been altered, and that the user is competent to digitally sign the document, and preventing the user from digitally signing the document for the signatory in response to a determination that one or more of: the identity of the user is invalid to digitally sign the document, the document has been altered, and that the user is not competent to digitally sign the document.

In still another embodiment, a computer-based tool for securely digitally signing a document is provided. The computer-based tool including non-transitory computer readable media having stored thereon computer code which, when executed by a processor, causes a computing device to perform operations. The operations include retrieving a document to be signed by one or more signatories. In embodiments, the document defining one or more terms, and signing the document by the one or more signatories includes providing an indication of acceptance of the one or more terms of the document. The operations also include receiving a request, by a user, to digitally sign the document for a signatory of the one or more signatories. In embodiments, digitally signing the document includes providing a digital signature representing the indication of acceptance of the one or more terms of the document by the signatory. The operations further include validating an identity of the user against an identity of the signatory to determine whether the identity of the user is valid to digitally sign the document, verifying the document to determine whether the document has been altered, determining whether the user is competent to digitally sign the document, allowing the user to digitally sign the document for the signatory in response to a determination that the identity of the user is valid to digitally sign the document, that the document has not been altered, and that the user is competent to digitally sign the document, and preventing the user from digitally signing the document for the signatory in response to a determination that one or more of: the identity of the user is invalid to digitally sign the document, the document has been altered, and that the user is not competent to digitally sign the document.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which:

FIG. 3 shows a high-level flow diagram of operations of a system for providing functionality for validating and confirming the integrity of documents and for validating identity related to the documents based on AI and/or blockchain systems in accordance with embodiments of the present disclosure.

Figure 1:
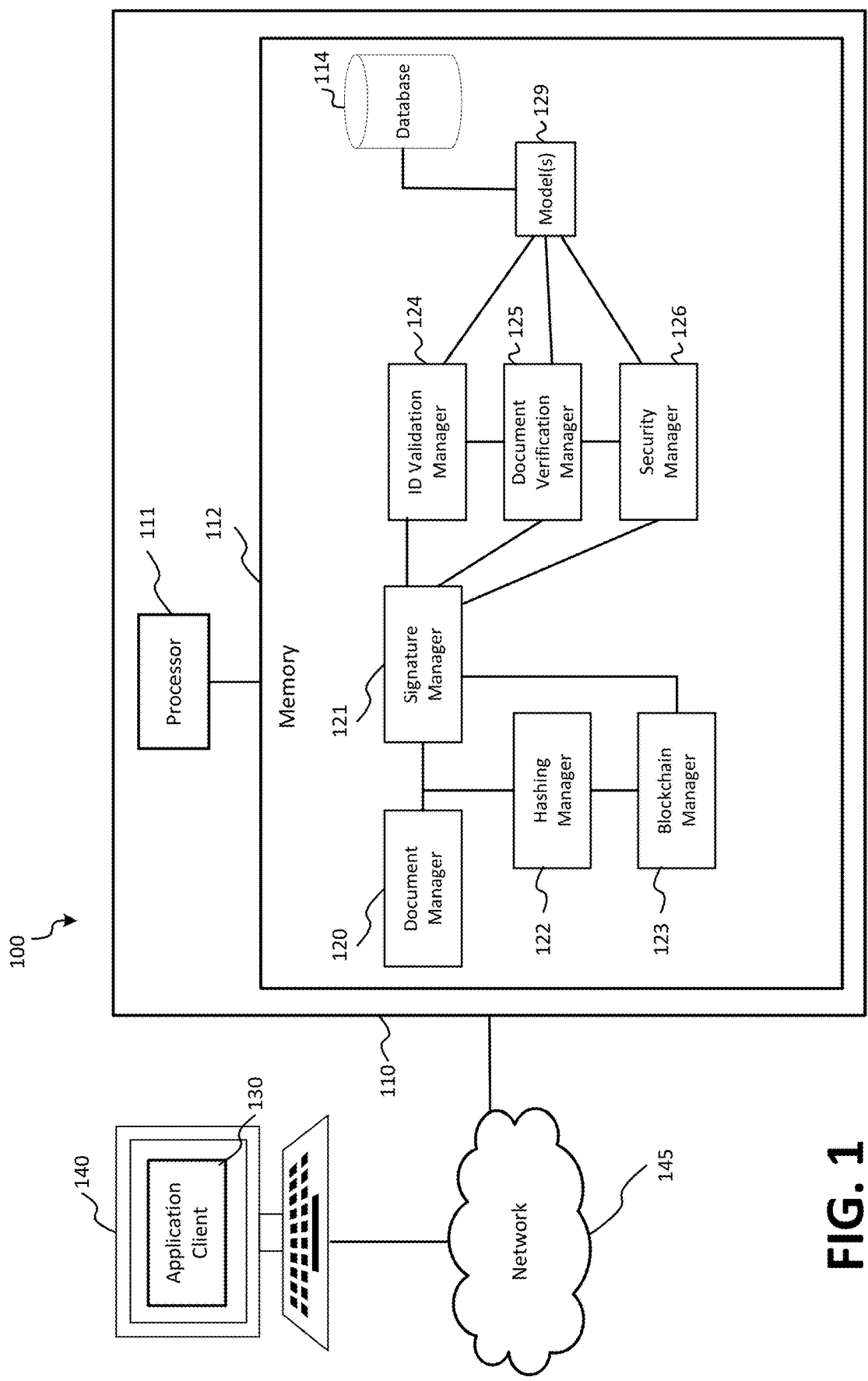
FIG. 1 a block diagram of a system providing functionality for validating and confirming the integrity of documents and for validating identity related to the documents based on artificial intelligence (AI) and/or blockchain systems in accordance with embodiments of the present disclosure.

It should be understood that the drawings are not necessarily to scale and that the disclosed embodiments are sometimes illustrated diagrammatically and in partial views.

In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

Various embodiments of the present disclosure are directed to systems and techniques that provide functionality for validating and confirming the integrity of documents and for validating identity related to the documents based on artificial intelligence (AI) and/or blockchain systems. In particular embodiments, a system may be configured with enhanced functionality to implement validation controls to validate and/or confirm the integrity of documents to safeguard against document tampering, ensuring the integrity of the document remains intact throughout the signing process and afterwards. In addition, in embodiments, the system may be configured to implement advanced verification and/or validation mechanisms to ensure the identity of the signatory parties of a document accurately reflects the authorized individual(s). The advantageous result of a system implemented in accordance with the present disclosure is a system that is able to address the critical gaps of current existing digital signature systems and in doing so, the present disclosure enables a system to significantly bolster the security, reliability, and trustworthiness of digital document signing and management.

FIG. 1 is a block diagram of an exemplary system 100 configured with capabilities and functionality for validating and confirming the integrity of documents and for validating identity related to the documents based on AI and/or blockchain systems in accordance with embodiments of the present disclosure. As shown in FIG. 1, system 100 may include server 110, user interface 140, and network 145. These components, and their individual components, may cooperatively operate to provide functionality in accordance with the discussion herein.

It is noted that the functional blocks, and components thereof, of system 100 of embodiments of the present disclosure may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally, or alternatively, when implemented in software, one or more of the functional blocks, or some portion thereof, may comprise code segments operable upon a processor to pro-vide logic for performing the functions described herein.

It is also noted that various components of system 100 are illustrated as single and separate com-ponents. However, it will be appreciated that each of the various illustrated components may be implemented as a single component (e.g., a single application, server module, etc.), may be functional components of a single component, or the functionality of these various components may be distributed over multiple devices/components. In such embodiments, the functionality of each respective component may be aggregated from the functionality of multiple modules residing in a single, or in multiple devices.

It is further noted that functionalities described with reference to each of the different functional blocks of system 100 described herein is provided for purposes of illustration, rather than by way of limitation and that functionalities described as being provided by different functional blocks may be combined into a single component or may be provided via computing resources disposed in a cloud-based environment accessible over a network, such as one of network 145.

User interface 140 may be implemented as, or as part of, a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. In embodiments, user interface 140 may be configured to provide an interface (e.g., a graphical user interface (GUI)) structured to facilitate a user interacting with system 100, e.g., via network 145, to execute and leverage the features provided by server 110. In embodiments, the user may be enabled, e.g., through the functionality of user terminal 140, to provide configuration parameters that may be used by system 100 to provide functionality for validating and confirming the integrity of documents and for validating identity related to the documents. In embodiments, user terminal 140 may be configured to communicate with other components of system 100. In embodiments, the functionality of user terminal 140 may include receiving results from server 110 and/or displaying the results of the operations of server to the user via the GIU of user terminal 140.

In various embodiments, the user terminal 140 may be specifically designed or configured to host and support one or more instances of an application client (e.g., application client 130). The purpose of this configuration is to enable the user terminal 140 to serve as a versatile platform for accessing and interacting with a range of software applications designed to meet the end-user's needs. The application client 130 is developed and optimized to act as a front-end interface for the server 110, thereby facilitating a seamless interaction between the end-user and the server's resources.

The application client 130 is conceived to encompass a broad spectrum of software applications, each tailored to provide an intuitive and efficient access point to the functionality offered by the server 110. This may include, but is not limited to, applications designed for data retrieval, processing, and presentation, communication services, and other server-based utilities that require a client interface for user interaction. Specifically, the software application embodied by application client 130 is equipped with a user-friendly graphical user interface (GUI) or command-line interface (CLI), through which users can execute a variety of operations or tasks that are processed by the server 110.

The architecture of application client 130 is such that it establishes a direct or indirect communication link with server 110, utilizing standard or proprietary communication protocols to ensure secure and efficient data exchange (e.g., via network 145). This communication framework enables the application client 130 to request data from the server 110, submit user inputs or commands, and receive responses or outputs from the server, which are then rendered or displayed to the user through the application client's interface. For example, application client 130 may provide functionalities for uploading documents to server 110, for retrieving documents for signature, for providing information for identification validation, for providing information for security verification, for checking status of documents, etc. all through a streamlined interface accessible on the user terminal 140.

Furthermore, the application client 130 may be implemented as a standalone application, a web-based application, or a hybrid that combines elements of both, depending on the specific requirements of the server 110 and the intended user experience. This flexibility in design allows for the application client 130 to be adaptable to various computing environments, including desktop computers, laptops, tablets, and smartphones, enhancing the accessibility and usability of the server 110's functionality across different platforms and devices.

The collaboration between the user terminal 140, application client 130, and server 110 exemplifies a client-server model that is central to a distributed computing system, where computational functionalities and services may be divided between service providers (servers) and service requesters (clients). This model not only facilitates the efficient distribution of computational resources but also promotes modularity and scalability in the development and deployment of software applications and systems.

In embodiments, server 110, and user terminal 140 may be communicatively coupled via network 145. Network 145 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc. In some embodiments, server 110, sources 130, and user interface 140 may be communicatively coupled directly to each other, without routing through network 145, such as via a direct connection between sources 130 and server 110, and/or a direct connection between user interface 140 and server 110.

Server 110 may be configured to facilitate operations for validating and confirming the integrity of documents and for validating identity related to the documents based on AI and/or blockchain systems. The functionality of server 110 may be provided by the cooperative operation of the various components of server 110, as will be described in more detail below.

It is noted that although FIG. 1 shows server 110 as a single server, it will be appreciated that server 110 (and the individual functional blocks of server 110) may be implemented as separate devices and/or may be distributed over multiple devices having their own processing resources, whose aggregate functionality may be configured to perform operations in accordance with the present disclosure. Furthermore, those of skill in the art would recognize that although FIG. 2 illustrates components of server 110 as single and separate blocks, each of the various components of server 110 may be a single component (e.g., a single application, server module, etc.), may be functional components of a same component, or the functionality may be distributed over multiple devices/components. In such embodiments, the functionality of each respective component may be aggregated from the functionality of multiple modules residing in a single, or in multiple devices. In addition, particular functionality described for a particular component of server 110 may actually be part of a different component of server 110, and as such, the description of the particular functionality described for the particular component of server 110 is for illustrative purposes and not limiting in any way.

As shown in FIG. 1, server 110 includes processor 111, memory 112, document manager 120, signature manager 121, hashing manager 122, blockchain manager 123, identification (ID) manager 124, document verification manager 125, security manager 126, one or more models 129, and database 114.

Processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some embodiments, implementations of processor 111 may comprise code segments (e.g., software, firmware, and/or hardware logic) executable in hardware, such as a processor, to perform the tasks and functions described herein. In yet other embodiments, processor 111 may be implemented as a combination of hardware and software. Processor 111 may be communicatively coupled to memory 112.

Memory 112 may comprise one or more semiconductor memory devices, read only memory (ROM) devices, random access memory (RAM) devices, one or more hard disk drives (HDDs), flash memory devices, solid state drives (SSDs), erasable ROM (EROM), compact disk ROM (CD-ROM), optical disks, other devices configured to store data in a persistent or non-persistent state, network memory, cloud memory, local memory, or a combination of different memory devices. Memory 112 may comprise a processor readable medium configured to store one or more instruction sets (e.g., software, firmware, etc.) which, when executed by a processor (e.g., one or more processors of processor 111), perform tasks and functions as described herein.

Memory 112 may also be configured to facilitate storage operations. For example, memory 112 may comprise database 114 for storing various information related to operations of system 100. For example, database 114 may store configuration information related one or more models 129, which may include artificial intelligence (AI) models, machine learning models, etc., configured to perform operations in accordance with the description herein. In embodiments, database 114 may store documents, such as documents being processes through system 100 for digital signature in accordance with embodiments of the present disclosure. The documents may include documents created by a user to be digitally signed, documents in the process of being signed, documents previously signed and/or hashed, document templates previously prepared, etc. Database 114 is illustrated as integrated into memory 112, but in some embodiments, database 114 may be provided as a separate storage module or may be provided as a cloud-based storage module. Additionally, or alternatively, database 114 may be a single database, or may be a distributed database implemented over a plurality of database modules.

Document manager 120 may be configured to provide functionality for managing documents to be signed. For example, document manager 120 may operate to serve as a comprehensive system for managing a wide array of documents that require signatures for the validation of terms agreed upon by one or more parties. These documents encompass a broad spectrum of types, including, but not limited to, legal contracts, agreements, consents, and any other form of document or data that delineates one or more terms to be accepted by signing parties. The signature, in this context, is not merely a traditional handwritten mark but is broadly construed to represent any act deliberately performed to signify the acceptance of the document's terms by the signatory. This acceptance can be manifested through various forms of signatures, such as applying a digital signature, clicking or pressing a button, checking a mark in a box, selecting an interactive graphical element on a digital interface, or even more advanced methods like nodding in acknowledgment to a camera for biometric recognition, among other innovative signals.

Within its operational framework, document manager 120 includes functionality to facilitate the creation of documents for signing. This creation process is notably flexible, accommodating several methodologies to cater to the diverse needs and preferences of document authors. One such method involves providing a GUI, enabling authors to craft the terms of the document and designate the parties required to sign it. This GUI may provide an intuitive platform for authors to directly input and arrange the terms, ensuring clarity and precision in the document's creation.

Document manager 120 may include functionality for uploading pre-prepared documents containing the necessary terms and signatory parties. This feature is particularly advantageous for integrating existing documents into the system, where document manager 120's advanced parsing functionality may come into play, analyzing and identifying the relevant parties designated for signing without necessitating manual input.

Expanding the scope of document creation, the document manager 120 may provide access to a repository of templates stored within the system's database (e.g., database 114). These templates may be tailored for a variety of document types, such as non-disclosure agreements, sales contracts, and more, streamlining the document creation process by offering a foundation that can be customized to fit specific requirements. This repository not only enhances efficiency but also promotes consistency and compliance across document types.

Particular to templates, templates may serve as a foundational framework for creating documents, providing a generic structure that encompasses the essential elements common to documents of a particular type. These templates may be designed to be reusable, with editable fields that can be customized for the specific details of each contract, thereby enhancing efficiency and uniformity across similar agreements. In embodiments, templates may be encoded using formats such as UTF encoding, which may provide simplicity and flexibility, allowing for easy insertion of custom fields and data. This may be particularly advantageous over image data, which may be excessively large for certain secure storage technologies (e.g., blockchain storage), posing challenges in terms of storage costs and efficiency.

In embodiments, document manager 120 (e.g., in cooperation with blockchain manager 123) may provide a mechanism for integrating identifying information stored on the blockchain into the templates is a pivotal process. This integration is facilitated through designated placeholders within the template, which are replaced with the relevant data from the blockchain to produce the final, fully personalized contract. This approach ensures that the core template remains generic and non-identifying, while the personalized and sensitive details are securely handled and stored on the blockchain, providing a robust layer of security and integrity.

In embodiments, the versatility provided by the implementation of the templates is further highlighted by their compatibility with various forms of encoding, such as HTML documents, ASCII text, or compressed text strings. This adaptability allows for the dynamic generation of contracts through web apps or other applications (e.g., application client 130), which amalgamate the template with specific parameters to render the finalized document. In instances where the content of the document is directly stored on the blockchain, an efficient method involves creating the document in HTML format within a blockchain function, subsequently encoding it in Base64 to optimize space utilization, making it ready for web browser rendering.

Document manager 120 may provide functionality for adding specific data to a template to customize the template for creating a document. In embodiments, the customization of the generic template into a specific document may involve adding client-specific fields, such as names, addresses, and company names, particularly in documents that include a contract, such as an NDA and the like. This process may involve interaction with the blockchain (e.g., through the functionality of blockchain manager 123), governed by the contract logic embedded within it. The permissions for modifying this data are meticulously defined by document manager 120, and may include assigning exclusive rights to the issuer or specified clients based on their wallet addresses. This framework provides the flexibility to update data as required or enforce its immutability, depending on the contractual agreement's nature and the involved parties' preferences.

When creating the document, document manager 120 may, upon finalizing the template selection and incorporating the client-specific details, render the data to construct the complete document. The integration of binding information, already secured on the blockchain, with the template results in a finalized document that can be accessed by designated users or disclosed publicly, as dictated by the document's terms. The rendering process, especially for UTF encoded data, is streamlined to inject required parameters into their designated fields within the template, followed by encoding—either through Base64 or encryption—to safeguard the document's content, culminating in the creation of the final document.

Beyond the creation of documents, document manager 120 is configured to manage documents throughout the entire lifecycle of the signing process. This may include overseeing documents that are in the midst of being signed—those that have been signed by one party but await the signature of additional parties. Furthermore, document manager 120 may extend its capabilities to the post-signature phase, managing documents that have been fully signed and securely stored. In tandem with hashing manager 122, document manager 120 may provide functionality to hash these signed documents, creating a unique digital fingerprint for each document. This hashing process plays a crucial role in ensuring the integrity and non-repudiation of the signed documents by enabling future verification of their authenticity and unaltered state.

In various embodiments, document manager 120 may include functionality to enhance the security and integrity of documents undergoing the signing process. This may be achieved through cooperative operation with hashing manager 122, which may include functionality to obtain hashes (e.g., cryptographic hashes) of the documents, and blockchain manager 123, which may include functionality for secure management of blockchain operations, including the storage and retrieval of data from a blockchain.

At the core of this system is the process of hashing documents at critical junctures in their lifecycle, from initial creation to final signing. Hashing serves as a digital fingerprint for each document, generated through the application of one or more cryptographic hashing algorithms. These algorithms transform the document's content into a unique, fixed-size hash value that serves as a verifiable identifier of the document's original state.

In embodiments, an initial hashing operation may typically be performed upon the finalization of the document by its author. This stage occurs once the terms to be agreed upon by the signing parties have been definitively established and incorporated into the document. Hashing manager 122, utilizing its sophisticated hashing capabilities, computes a hash of the finalized document. This hash encapsulates the essence of the document at this finalized stage, ensuring that any subsequent modifications can be detected.

Following the generation of the finalized document hash, hashing manager 122, in coordination with blockchain manager 123, may proceed to store the hash on the blockchain. This step is pivotal, as it leverages the blockchain's inherent security features—such as immutability and transparency—to safeguard the hash against tampering or unauthorized access. By anchoring the document's hash in the blockchain, the integrity of the finalized document is preserved, enabling its storage on servers, even those not secured, without compromising its authenticity.

This blockchain-based hash storage mechanism serves as a protective layer throughout the document's lifecycle, especially during the signing process. For instance, after one party has signed the document but before the subsequent party signs, hashing manager 122 may re-hash the partially signed document and update the blockchain with this new hash. This ensures that the second signer is presented with the document in the exact form as signed by the first party, preventing any discrepancies or unauthorized changes that could compromise the agreement's terms.

Moreover, upon the completion of the signing process by all relevant parties, hashing manager 122 may perform a final hashing of the fully signed document. This final signed document hash may then se securely stored on the blockchain, serving as a definitive reference for the document's content post-signature. Should there be any attempt to alter the document after it has been fully signed, such modifications would result in a hash different from the one stored on the blockchain. This discrepancy allows for the easy detection of unauthorized changes, which may ensure that the document presented as signed by the parties is indeed the genuine, unaltered agreement.

Through this intricate process of document hashing at various stages and secure hash storage on the blockchain, document manager 120, in cooperative operations with hashing manager 122 and blockchain manager 123, may provide a robust mechanism for maintaining the integrity and authenticity of documents throughout their lifecycle. This ensures that all parties involved in the signing process can trust in the veracity of the documents they are signing, safeguarding against fraud and unauthorized alterations.

In embodiments, document manager 120 may include functionality for storing the document (e.g., through the entire lifecycle of the signing process and even after the document has been signed). In embodiments, the decision on how and where to store the documents may be influenced by the specific requirements of the application and the desired balance between accessibility, security, and cost-efficiency. The options may include direct storage on the blockchain, leveraging a distributed filesystem for enhanced accessibility, or opting for a private server for centralized control. Each storage method presents its own set of advantages and considerations, from the immutability and security offered by blockchain storage to the scalability and privacy afforded by distributed filesystems or private servers.

Signature manager 121 may be configured to facilitate signing of the document. In embodiments, signing a document may include enabling each of the signing parties to enter a digital signature, and to generate a signature object in response to receiving a signature from each of the signing parties. As noted above, in embodiments, a digital signature by a signatory may be not include only a traditional handwritten mark but it may include any act deliberately performed to signify the acceptance of the document's terms by the signatory. This acceptance can be manifested through various forms of signatures, such as applying a digital signature, clicking or pressing a button, checking a mark in a box, selecting an interactive graphical element on a digital interface, or even more advanced methods like nodding in acknowledgment to a camera for biometric recognition, among other innovative signals.

In embodiments, a signatory may be provided a mechanism (e.g., through application client 130) to provide a digital signature signifying acceptance of the terms of the document. The signatory may then indicate acceptance of the terms of the document by providing a digital signature. Each of the signatories to the document may be provided a mechanism for entering a digital signature.

In embodiments, signature manager 121 may generate a digital signature object in response to a determination that all signatories to the document have provided a digital signature. In embodiments, the digital signature object may include a data structure representing the acceptance by all signatories and may represent that the document has been accepted and is signed. In embodiments, the digital signature object may be a separate object from the document itself, but may be bound to the document. For example, an identification (e.g., a hash of the signed document, or anther ID) may be stored as associated with the digital signature object. In this manner, the digital signature object may be bound to the signed document. In some embodiments, a graphical representation of the signature by the signatories (e.g., a graphical mark, a symbol, the signatories name, etc.) may be superimposed onto the document (e.g., as an image onto the document) in an are of the document configured for accepting a signature, to provide an indication that the document is a signed document. The document with the superimposed graphical signature may then be hashed as a signed document and the hash (and/or the signed document) may be stored in the blockchain, along with the digital signature object.

In some embodiments, the graphical signature by the signatories may not be superimposed onto the document before storing, but the signed document (without the graphical signature) may be hashed and the hash (and/or the signed document) may be stored in the blockchain, along with the digital signature object for the document. In this case, when the object is retrieved (e.g., using application client 130 and/or document manager 120), the signed document (without the graphical signature) may be retrieved, the digital signature object, which may include the hash of the signed document, may be retrieved, and the hash may be compared against the hash of the retrieved signed document (without the graphical signature). If the hashes match, indicating that the retrieved document is valid, the graphical signature may then be superimposed onto the signed document and the signed document with the superimposed graphical signature may be presented to the user as the signed document.

In embodiments, signature manager 121 may be configured to, before allowing a signatory to sign a document, and/or before generating a digital signature object for a document, perform one or more validations, such as using the functionality of ID validation manager 124, document verification manager 125, and/or security manager 126.

For example, ID validation manager 124 may be configured to validate the identification of the signing parties (e.g., signatories) to the document. In embodiments, ID validation manager 124 may be configured to determine that a user providing a digital signature to a document is the signatory that is supposed to be signing the document. For example, party X is a party to a document and party X is supposed to sign the document. A session is currently ongoing to sign the document for party X, such as to provide a digital signature to indicate acceptance of the terms of the document by party X. In embodiments, ID validation manager 124 may operate to ensure that the user providing the digital signature indicating acceptance of the terms of the document by party X is in fact party X. In this case, in response to a determination that the user providing the digital signature indicating acceptance of the terms of the document by party X is in fact party X, ID validation manager 124 may provide a positive signal to signature manager 121, in which case signature manager 121 may proceed to allow the user to provide the digital signature for party X and/or to generate a digital signature object for the document (e.g., when all signatories have provided a valid digital signature). On the other hand, in response to a determination that the user providing the digital signature indicating acceptance of the terms of the document by party X is not in fact party X, ID validation manager 124 may provide a negative signal to signature manager 121, in which case signature manager 121 may not proceed to allow the user to provide the digital signature for party X and/or may not proceed to generate a digital signature object for the document.

In embodiments, validating the identification of a signatory may include causing user terminal 140 to collect information related to the identification of the user and determining whether the information related to the identification of the user indicates that the user is the signatory. For example, user terminal 140 may obtain information related to biometric information of the user. For example, in a particular embodiments, user terminal may activate a camera and may cause the user (e.g., through an indication) to present an official identification document (e.g., driver's license, ID, passport, etc.) that may include one or more of the user's name, picture, address, etc. ID validation manager 124 may process (e.g., using one or more models 129) the official identification document and may obtain identifying information of the user (e.g., name, address, date of birth, etc.) and the picture from the identification. ID validation manager 124 may then ensure that the identifying information of the user matches the information of the signatory to determine whether the user has presented an official identification document of the signatory. If the identifying information of the user does not match the information of the signatory (e.g., the person who is supposed to sign the document), then ID validation manager 124 sends a negative signal to signature manager 121 indicating that the ID of the signatory is not valid and should not be allowed to provide a digital signature. On the other hand, if the identifying information of the user matches the information of the signatory (e.g., the person who is supposed to sign the document), then ID validation manager 124 may capture (e.g., via the camera of user terminal 140) the view of the camera. In embodiments, the user may be indicated to ensure that the face of the user be within the view of the camera. In this case, ID validation manager 124 may obtain the image, in real-time, of the user visible to the camera. ID validation manager 124 may then compare the image of the user present in the camera in real-time with the image obtained from the official identification document (e.g., which matches the identity of the signatory), such as using one or more models 129. If the image of the user captured in real time matches the image obtained from the official identification document, then ID validation manager 124 may send a positive signal to signature manager 121 indicating that the ID of the signatory is valid. On the other hand, if the image of the user captured in real time does not match the image obtained from the official identification document, then ID validation manager 124 may send a negative signal to signature manager 121 indicating that the ID of the signatory is invalid. In this manner, ID validation manager 124 may ensure that the person present to sign the document is the person signatory, and that the signatory has presented valid documentation.

In certain embodiments, validating the identification of a signatory may include a multifaceted approach involving the collection and analysis of identification information (e.g., leveraging the functionality of user terminal 140). This process is crucial for establishing the authenticity of the individual intending to sign a document, ensuring that the signatory is indeed who they claim to be. Initially, user terminal 140 may be activated to gather information pertinent to the user's identity, which may include, but is not limited to, biometric data. Biometric data, recognized for its uniqueness to each individual, provides a high level of security and accuracy in identity verification processes.

In a specific embodiment, user terminal 140 140 may activate a camera (e.g., a webcam, a cell phone camera, etc.) as a means to collect identification information. The user may be prompted to present an official identification document, such as a driver's license, identification card, or passport, to the camera. These documents are rich sources of identifiable information, typically containing the user's name, photograph, address, date of birth, and other personal details. ID validation manager 124 then proceeds to process this information, utilizing advanced models (e.g., models 129) designed for intelligent data extraction and analysis.

In embodiments, ID validation manager 124 may perform ID validation using at least two stages of verification. For example, in a first step, ID validation manager 124 may perform identifying document analysis. In embodiments, ID validation manager 124 analyses the official identification document presented by the user, extracting key identifying information such as name, address, and date of birth, alongside the user's photograph. This extracted information is then cross-referenced with the details of the signatory as recorded in the system. If there is a discrepancy between the identifying information of the user and that of the signatory, ID validation manager 124 may send a negative signal to signature manager 121. This negative signal may indicate the invalidity of the ID, and signature manager 121 may prevent the user from proceeding with providing a digital signature on the grounds of failed identity verification.

In a second step, ID validation manager 124 may, in response to a determination that the extracted information aligns with the signatory's details, advance to the biometric verification stage. Here, the user may be instructed to position their face within the camera's view. The camera may capture a real-time image of the user, which ID validation manager 124 may compare to the photograph obtained from the official identification document. This comparison, facilitated by sophisticated algorithms within models 129, aims to confirm the physical presence and identity of the user in real-time. A match between the real-time image and the document photograph results in ID validation manager 124 issuing a positive signal to signature manager 121, affirming the validity of the signatory's ID. Conversely, a mismatch triggers a negative signal, indicating the signatory's ID as invalid.

This comprehensive validation process ensures a high degree of security and authenticity in the digital signing process. By incorporating both document verification and biometric verification steps, the system robustly protects against identity fraud and unauthorized signing activities. The use of real-time image capture and comparison further enhances the system's ability to verify the signatory's presence and authenticity, making the digital signature process more secure and reliable.

In embodiments, ID validation manager 124 may be configured with functionality to validate the ID of the actual signing party, and to respond to the absence of the signatory. For example, ID validation manager 124 may be configured to maintain the camera in an active state throughout the entire duration of the signing process. For example, ID validation manager 124 may be configured to maintain the camera in an active state while the user provides the digital signature (e.g., presses a button, draws a signature, etc.). This continuous activation may ensure that the signatory's face remains within the camera's field of view, providing a persistent, real-time verification of the signatory's presence and identity. This method of continuous biometric verification represents a significant advancement in digital signing technologies, offering an added layer of security by verifying not only the identity of the signatory at the initiation of the signing process but also their continuous presence and engagement during the process.

The functionality provided by ID validation manager 124 may enable the system to respond dynamically to instances where the signatory's face becomes obscured or exits the field of view of the camera. Such scenarios could potentially compromise the integrity of the signing process, as they interrupt the continuous verification of the signatory's identity. To mitigate this risk, ID validation manager 124 is configured to instantly detect any such occurrence of obstruction or absence of the signatory's face. Upon detection, ID validation manager 124 may initiate a protocol to temporarily disable the mechanism provided for accepting the digital signature. This can manifest in the user interface as the signature button or box being greyed out or becoming inactive, effectively halting the signing process.

The suspension of the signing process serves as a protective measure, ensuring that the digital signature cannot be provided—or, if in progress, completed—without the signatory's verified presence. ID validation manager 124 requires the signatory to rectify the issue by ensuring their face is once again visible within the camera's view. The moment ID validation manager 124 verifies the return of the signatory's face to the visible area, ID validation manager 124 signals signature manager 121 to reactivate the digital signature mechanism. This reactivation restores the ability for the signatory to proceed with providing their digital signature, thus resuming the signing process.

This functionality emphasizes the system's adaptability and responsiveness to real-time conditions, ensuring that the digital signature is only provided under continuous and verified presence of the signatory. By implementing this dynamic verification process, the system significantly enhances the security and authenticity of digital signatures. This functionality provides a robust safeguard against potentially fraudulent activities, such as attempts to complete the signing process without the signatory's continuous consent and presence.

In embodiments, ID validation manager 124 may be configured to perform a screen capture of the signatory's face while the face remains within the camera's field of view, simultaneously with the act of entering the digital signature. This dual capture not only verifies the signatory's presence but also directly associates their physical presence with the specific action of signing, which may serve as incontrovertible proof of the signatory's active participation in the signing process. This evidence is critical in affirming that the individual present in the screen capture is indeed the person who executed the digital signature on the document.

To ensure the security and integrity of the captured screen image, hashing manager 122 may apply a cryptographic hash function to the screen capture. This hashing process transforms the visual data into a unique, fixed-length hash value that serves as a digital fingerprint of the screen capture at the moment of signing. The uniqueness of this hash value ensures that any subsequent alteration to the screen capture can be easily detected by comparing the stored hash value to a newly computed hash of the altered image.

Following the generation of the hash, blockchain manager 123 may securely store the hash value on the blockchain. The immutable nature of blockchain technology guarantees that once the hash is recorded, it cannot be altered, ensuring the permanent integrity of the proof of signing. This blockchain-based storage method provides a tamper-proof ledger of transactions that can be publicly verified, adding an additional layer of security and transparency to the digital signing process.

In some embodiments, the original screen capture may be stored on a storage server. This server can be either secured or unsecured, as the critical factor ensuring the integrity of the screen capture is the hash value stored on the blockchain. Should the need arise to verify the authenticity of the screen capture, the stored hash value can be compared with a hash computed from the screen capture at the time of verification. A match between these hash values confirms the screen capture's integrity, while any discrepancy would indicate tampering or alteration.

This sophisticated approach to capturing and securing evidence of the signatory's presence and participation in the digital signing process addresses potential concerns regarding the authenticity of digital signatures. By integrating screen capture technology with cryptographic hashing and blockchain storage, ID validation manager 124 provides a robust framework for ensuring that digital signatures are executed with the highest level of security and verifiability.

In embodiments, ID validation manager 124 may include state-of-the-art functionality to detect and counteract deep fake attempts. This capability is powered by one or more advanced models (e.g., models 129), which are specifically trained to discern subtle discrepancies and anomalies that distinguish deep fakes from authentic biometric data. Given the sophistication of modern deep fake techniques—some of which can craft representations so convincing that they are indistinguishable from real identities to the human eye—employing AI-based detection models becomes essential. These models analyze a wide array of data points, including facial dynamics, texture, and behavioral patterns, to identify inconsistencies characteristic of deep fakes.

To further enhance the efficacy of the anti-deep fake measures, ID validation manager 124 may incorporate an interactive verification layer. This layer involves issuing real-time instructions to the user during the verification process, requiring the performance of simple, spontaneous actions that would be challenging for deep fake technologies to replicate accurately in real-time. Examples of such instructions might include "raise your right hand" or "wave with your left hand." These actions introduce an additional layer of complexity to the verification process, significantly increasing the difficulty of executing a convincing digital forgery. The instructions are designed to be straightforward and easily executable, ensuring that the verification process remains user-friendly while substantially enhancing security. To maintain the efficiency of the transaction process, these interactive verification tasks come with a completion timeout. If the instructed action is not completed within the designated timeframe, the system interprets this as a potential security risk, leading to the automatic timeout of the transaction. This timeout serves as a protective measure, safeguarding against the possibility of prolonged attempts to bypass the verification process through sophisticated deep fake manipulations.

This innovative approach, combining advanced AI-driven deep fake detection with interactive, real-time verification challenges, represents a comprehensive strategy to fortify digital identities against the threat of deep fakes. By integrating these technologies into ID validation manager 124, the system not only enhances its ability to authenticate identities with high precision but also ensures that the digital signing process is resilient against the most advanced forms of digital forgery.

In embodiments, document verification manager 125 may be configured to verify that that the integrity of the document has not been compromised before allowing the signatory to sign (e.g., to provide a digital signature) the document. As noted above, multiple hashes may be obtained for the document during the signing process. In particular, a hash may be obtained when the document is ready to be signed by the signing parties to the document (e.g., the signatories), which may be stored in the blockchain. In embodiments, each time a signatory successfully signs the document (e.g., after validations), the signed document is hashed, and the hash is stored in the blockchain. For example, before the first signatory sings the document (e.g., the first signatory being the signatory signing a document that has not been signed by another signatory yet), document verification manager 125 may hash the document to be signed by the signatory, may obtain the hash of the finalized document (e.g., the hash of the document that was purported to be the document ready to be signed by the signatories), and may determine whether the hashes match. If the hashes do not match, this means that the finalized document was altered and a negative signal may be sent to signature manager 120 to prevent a digital signature to be entered and the signing fails. On the other hand, if the hashes match, this means that the finalized document was not altered and a positive signal may be sent to signature manager 120 to allow a digital signature to be entered for the document. Once the document is signed by the first signatory, the signed document is hashed and the has is stored in the blockchain. In the case that other signatories are to sign the document, before a subsequent signatory sings the document (e.g., a subsequent signatory being a signatory signing a document that has already been signed by at least one other signatory), document verification manager 125 may hash the document to be signed by the subsequent signatory, may obtain the hash of the already signed document (e.g., the hash of the document that was purported to be the document already signed by the at least one other signatory), and may determine whether the hashes match. If the hashes do not match, this means that the document was altered and a negative signal may be sent to signature manager 120 to prevent a digital signature to be entered by the subsequent signatory. On the other hand, if the hashes match, this means that the document was not altered and a positive signal may be sent to signature manager 120 to allow a digital signature to be entered by the subsequent signatory for the document.

In certain embodiments, document verification manager 125 may be configured to verify that that the integrity of the document has not been compromised before allowing the signatory to sign (e.g., to provide a digital signature) the document. This verification process is foundational to the security measures implemented to prevent unauthorized alterations and ensure that the document presented for signing is the exact document agreed upon by all parties involved. Leveraging the immutable properties of blockchain technology, document verification manager 125 enables a system to employ a strategy involving the generation and comparison of multiple cryptographic hashes at various stages of the document's lifecycle.

As noted above, during initial creation of a document to be signed by the signatories, and particularly upon finalization of the document (e.g., upon finalizing the document as ready to be signed by the signatories), a cryptographic hash of the document may be obtained and stored on the blockchain, serving as a benchmark for subsequent verifications. As each signatory completes their part of the signing process, and following successful identity and authorization validations, document verification manager 125 proceeds to hash the newly signed version of the document. This action creates a new cryptographic hash reflecting the document's updated state, now including the signatory's digital signature. Each newly generated hash, corresponding to each stage of the signing process, is stored on the blockchain, further enriching the document's cryptographic audit trail.

Before a signatory proceeds with their digital signature, document verification manager 125 undertakes a critical comparison. For the initial signatory, prior to the first signatory applying their digital signature, document verification manager 125 retrieves the hash of the document prepared for signing (e.g., the document presented to the initial signatory) and compares it with the previously stored hash of the document in its finalized, pre-signature state. A mismatch between these hashes would indicate an unauthorized alteration of the document post-finalization but pre-signature, triggering document verification manager 125 to send a negative signal to signature manager 120. This negative signal effectively blocks the digital signature process, safeguarding against the signing of an altered document.

For subsequent signatories, such as in embodiments involving multiple signatories, before each subsequent signatory adds their digital signature, document verification manager 125 performs a similar hash comparison. This time, the comparison is between the hash of the document as it is currently presented to the subsequent signatory—with previous signatures—and the hash stored on the blockchain after the last signatory's contribution. Discrepancies at this stage indicate alterations made post-previous signatures, leading to a negative signal to prevent further signing. Conversely, matching hashes confirm the document's integrity, allowing the signing process to continue with a positive signal.

This meticulous, stepwise verification process ensures the document's integrity is preserved from the first to the last signature. By embedding each version's hash into the blockchain, the system creates an unalterable record of the document's evolution through the signing process, offering a transparent and secure method to verify document authenticity and integrity at any point.

Security manager 126 may be configured to ensure that the signatories are competent to sign the document. Within this context, ensuring the competency of the signatories may include ensuring that the signatories are able to sign the document, are not under duress, and understand the terms of the document being signed. In this manner, security manager 126 is configured to uphold the highest standards of security and ethical conduct during the digital signing process. One of the functions of security manager 126 may encompass a comprehensive evaluation of the signatory's competency, willingness, and understanding of the document they are about to sign. This may involve intricate checks to confirm that signatories are legally capable of signing the document, are acting of their own volition without any form of coercion, and possess a clear understanding of the document's terms and implications.

In some embodiments, security manager 126 may include functionality to detect potential fraud in the signing process. For example, to combat and detect potential fraud, particularly those schemes targeting vulnerable populations such as the elderly or cognitively impaired, security manager 126 is equipped with sophisticated functionality. It leverages real-time monitoring techniques, utilizing the user terminal's camera to capture images or video feeds of the signatory during the act of signing. This continuous observation serves as a crucial layer of protection, enabling the system to identify any indications of distress, confusion, or duress that may signify the signatory's compromised ability or willingness to consent to the document's terms.

The detection mechanisms employed by security manager 126 are powered by advanced artificial intelligence and machine learning models (e.g., one or more models 129). These models may be trained to recognize subtle cues and behaviors indicative of distress or duress, such as physical signs of discomfort, hesitation, or emotional distress, as well as potential indicators of external pressure or influence. Upon identifying such signs, security manager 126 promptly initiates protective measures to halt the signing process.

In some embodiments, security manager 126 may obtain a video stream (e.g., via the camera of user terminal 140) and may apply the one or more models 129 against the video stream to detect signs of distress or duress. In some embodiments, security manager 126 may obtain an audio stream (e.g., may activate a microphone of user terminal 140) and may apply the one or more models 129 against the audio stream to detect signs of distress or duress (e.g., sounds, noises, speech, etc.). In some embodiments, the one or more models 129 may analyze the audio stream to detect speech, may detect phrases spoken in the speech, and may determine whether the spoken phrases indicate that the user is under duress, coercion, or distress, or may determine that the speech indicate that fraud may be present.

If signs of duress, distress, or any anomaly suggesting potential fraud are detected, security manager 126 may transmits a negative signal to signature manager 120. This negative signal acts as an intervention, effectively preventing the completion of the digital signature and thereby safeguarding the signatory from potentially entering into an agreement under unfavorable conditions. This immediate response underscores the system's commitment to ethical standards and the protection of signatories' rights and well-being.

Furthermore, in embodiments, security manager 126 may extend its protective measures beyond the immediate interruption of the signing process. Upon detection of distress or duress, an alert mechanism may be triggered, generating a notification that is dispatched to a predefined contact, such as a caretaker, legal guardian, or another designated point of contact. This notification serves to inform relevant parties of the concerns raised during the signing process, facilitating timely intervention and support for the signatory.

Security manager 126 may be configured to ensure that the signatories understand the terms of the document being signed. For example, security manager 126 may be configured to assess the understanding of a signatory regarding the terms and conditions of the document to be signed. This assessment is facilitated through the generation of a targeted cognitive test, leveraging sophisticated models (e.g., one or more models 129), which may analyze the document's contents to create questions, quizzes, or tests that are configured to accurately assess understanding of key terms and stipulations in the document.

In a particular example, the cognitive test may present a series of questions derived from or based on the document's content, requiring the user to demonstrate their comprehension by correctly answering these questions before proceeding to sign. This innovative approach ensures that passing the test serves as a robust indication of the user's understanding of the document, safeguarding against uninformed consent. Conversely, failure to pass the test raises a significant concern regarding the user's comprehension, potentially halting the signing process to prevent the execution of documents under misunderstanding or misinformation.

In scenarios where a user fails the cognitive test, the system may either restrict the user from signing the document or generate an alert to notify relevant parties, such as legal guardians, attorneys, or other designated stakeholders. This notification serves as a critical intervention, allowing for the possibility of additional support or clarification to ensure the signatory's full understanding before proceeding.

Furthermore, in additional or alternative embodiments, the cognitive test may be tailored not only based on the document's specific content but also considering the signatory's demographic profile, such as gender, age, and/or educational background. This personalized approach enhances the relevance and effectiveness of the test, ensuring it is appropriately challenging yet understandable for the signatory.

The application of machine learning and artificial intelligence algorithms, including natural language processing (NLP), enables security manager 126 to conduct a deep analysis of the document. This analysis may identify the document's subject matter, category, and/or key concepts, forming the basis for generating a relevant and focused cognitive test. The test, therefore, not only assesses the signatory's understanding of the document's specific terms but also their grasp of its broader implications and context.

This feature is particularly valuable in protecting vulnerable individuals from potential exploitation or fraud. By ensuring that a signatory, such as an elderly person potentially targeted by scammers, fully understands the document they are signing, the system acts as a powerful deterrent against deceptive practices. The cognitive test acts as a gatekeeper, preventing the execution of documents under conditions of misunderstanding or duress, thereby preserving the integrity of the signing process and protecting the rights and interests of all parties involved.

Blockchain manager 124 may be configured to provide management of operations related to writing, reading, and retrieving data from a blockchain. In embodiments, once data is written to the blockchain, the data on the blockchain is immutable. This immutability ensures that the data, once entered into the ledger, cannot be altered or erased, thereby offering a high level of security and trustworthiness. In embodiments, blockchain manager 124 plays a pivotal role in this ecosystem by providing the necessary functionality to manage the blockchain operations effectively.

One of the key functions of blockchain manager 124 is to facilitate the writing of hash data for documents to the blockchain system. This process typically involves generating a cryptographic hash of a document or piece of data (e.g., using the functionality of hashing manager 123 or a similar component). The hash serves as a unique digital fingerprint of the data, encapsulating its essence in a fixed-size string. By writing this hash to the blockchain, blockchain manager 124 ensures that the original data can be verifiably preserved without storing the actual data on the blockchain, thereby optimizing both security and efficiency.

Storing hashes on the blockchain system as opposed to the documents themselves offers several advantages. Firstly, it significantly reduces the amount of data that needs to be stored on the blockchain, addressing potential scalability issues. Secondly, it enhances the privacy and security of the original data by not exposing the content directly on the blockchain. Lastly, it leverages the blockchain's inherent immutability to ensure that once a hash is stored, it cannot be altered or tampered with. This guarantees that if a document hash is retrieved from the blockchain system at any point in the future, stakeholders can be confident that it remains unchanged and uncompromised, thereby affirming the integrity of the original document.

In practical terms, the functionality of blockchain manager 124 facilitates a secure and efficient mechanism for proving the authenticity and integrity of documents over time. Whether it's proving the existence of a document at a certain point in time, verifying the authenticity of a transaction, or ensuring the integrity of critical records, blockchain manager 124 enables these operations through its sophisticated management of the blockchain system.

Another key functionality of blockchain manager 123 is to facilitate the storage of signature objects on the blockchain. This process begins once a signature object is generated by the signature manager 121. A signature object, in this context, represents a digital encapsulation of a signatory's agreement to the terms outlined in a document. It may include, but is not limited to, a digital signature, timestamp, signatory identification, and potentially other metadata that collectively validate the signatory's consent and the timing of such consent. In embodiments, the signature object may represent a data structure to be stored in the blockchain.

Upon the creation of a signature object by the signature manager 121, the blockchain manager 123 is tasked with a crucial operation: the secure storage of this signature object on the blockchain, in a manner that is indelibly linked to the specific document to which the signature pertains. This linkage is vital, as it ensures that each signature can be unequivocally associated with its corresponding document, thereby reinforcing the integrity of the signing process.

The operation performed by blockchain manager 123 leverages the inherent characteristics of blockchain technology—namely, its decentralization, immutability, and transparency. By storing the signature object on the blockchain, blockchain manager 123 ensures that once recorded, the signature object cannot be altered, deleted, or tampered with in any form. This immutability serves as the foundation for the mechanism that guarantees the authenticity of the signature.

Furthermore, the process of storing the signature object on the blockchain involves cryptographic techniques. These techniques not only secure the signature object itself but also protect the association between the signature and its corresponding document. This is typically achieved through the use of cryptographic hashes and smart contracts. A cryptographic hash of the document may be used to create a unique identifier for the document, which is then stored on the blockchain alongside the signature object. Smart contracts, on the other hand, can automate the association between the signature object and the document's hash, ensuring that the linkage is maintained securely and indelibly on the blockchain.

This blockchain-based storage mechanism provides several key advantages. Firstly, it offers a high degree of security, protecting against the risk of signature forgery and unauthorized document alterations. Secondly, it ensures the verifiability of the signature, as any stakeholder with the appropriate permissions can query the blockchain to verify the authenticity of a signature and its association with a specific document. Finally, this approach enhances the transparency of the signing process, as the immutable record of the signature on the blockchain provides a trustable and permanent audit trail.

In essence, the functionality of blockchain manager 123 to store signature objects on the blockchain represents a sophisticated blend of cryptographic security and blockchain technology's inherent strengths. This not only assures the authenticity of the signatures but also significantly elevates the overall integrity and trustworthiness of digital transactions involving signed documents.

Operations of system configured with functionality for validating and confirming the integrity of documents and for validating identity related to the documents based on AI and/or blockchain systems in accordance with embodiments of the present disclosure will now be discussed with reference to FIGS. 2A-2X. In embodiments, these operations may be performed by system 100 illustrated in FIG. 1 and discussed above. In particular, these operations may represent operations of an application client (e.g., application client 130) presented in a user terminal (e.g., user terminal 140) leveraging functionality of a server (e.g., server 110).

Figure 2A:
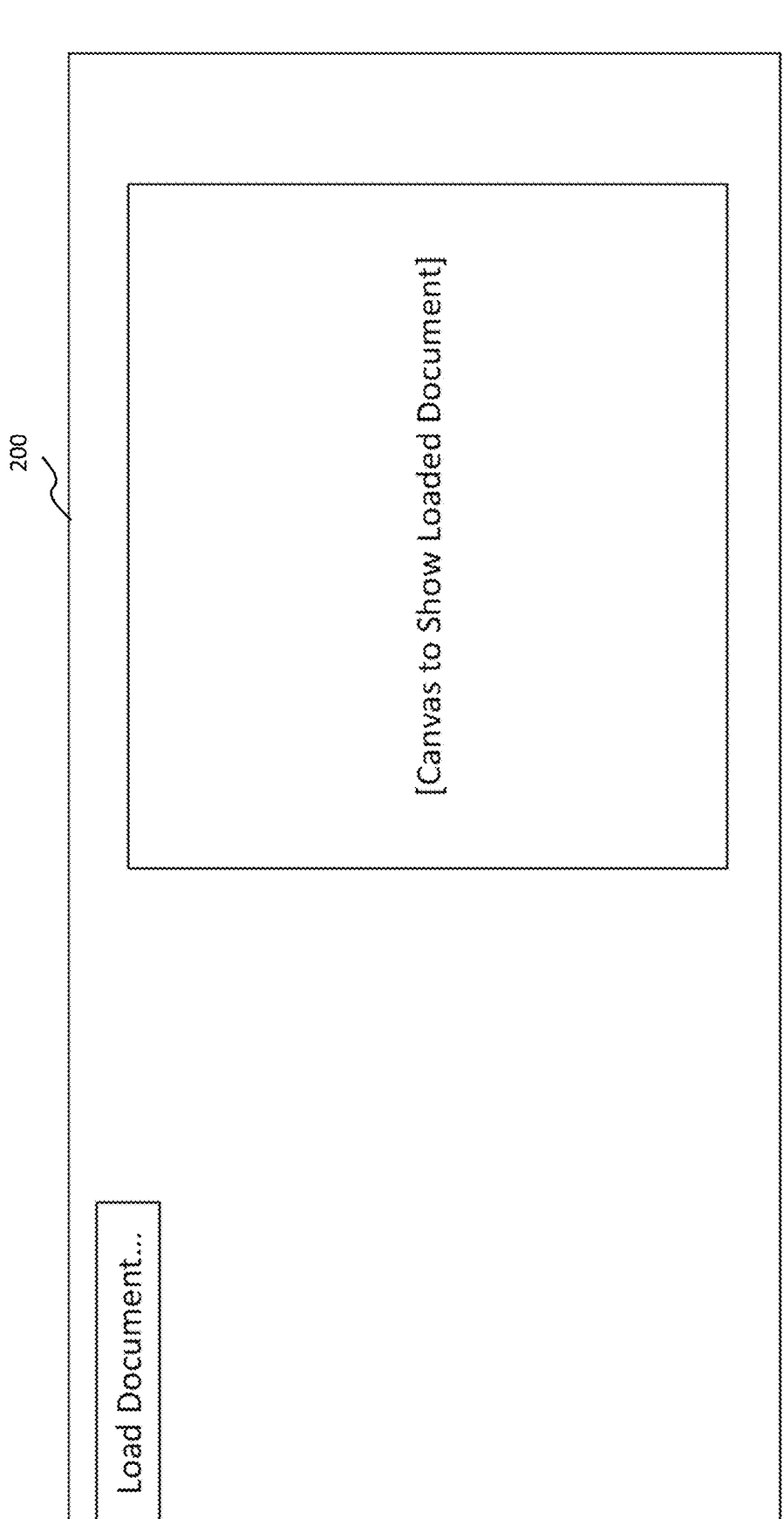
FIGS. 2A-2X illustrate operations of a system configured with functionality for validating and confirming the integrity of documents and for validating identity related to the documents based on AI and/or blockchain systems in accordance with embodiments of the present disclosure.
Figure 2B:
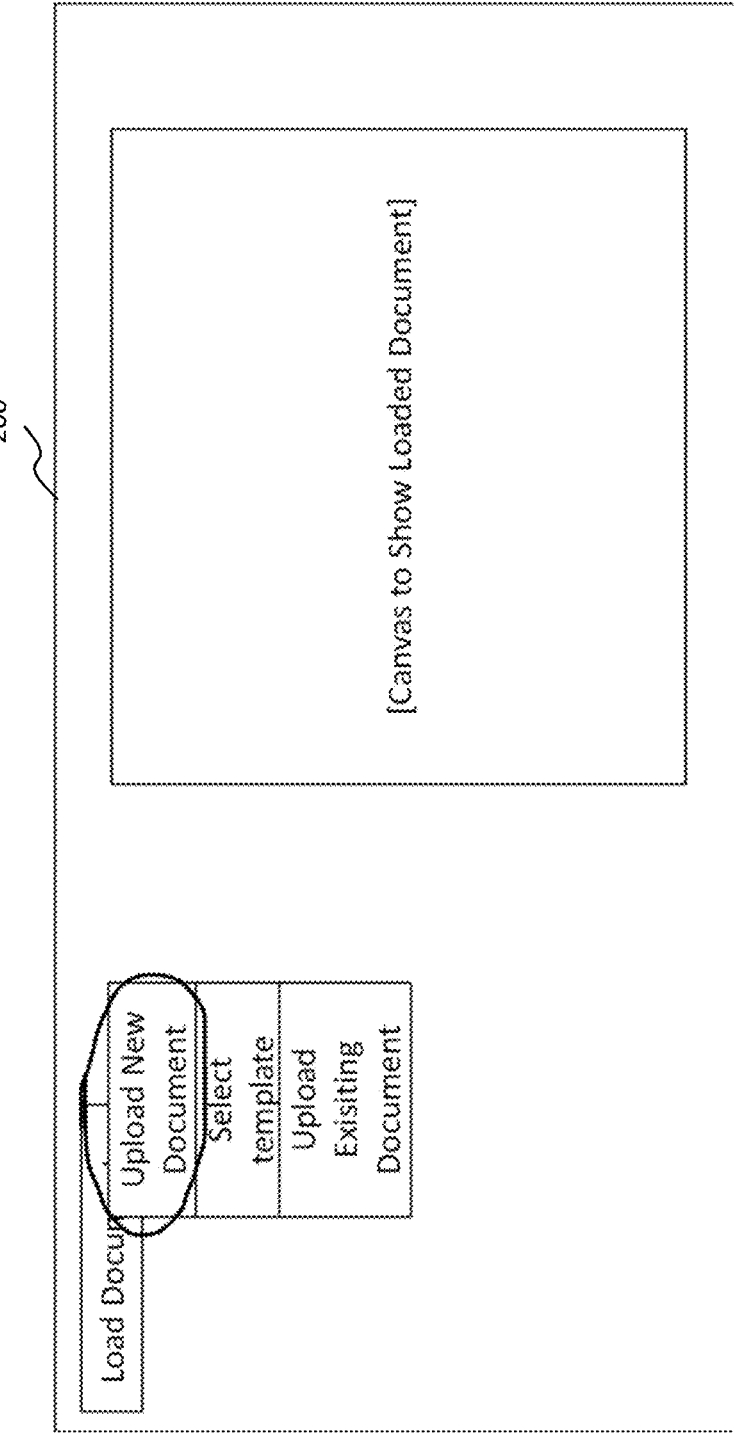
Figure 2C:
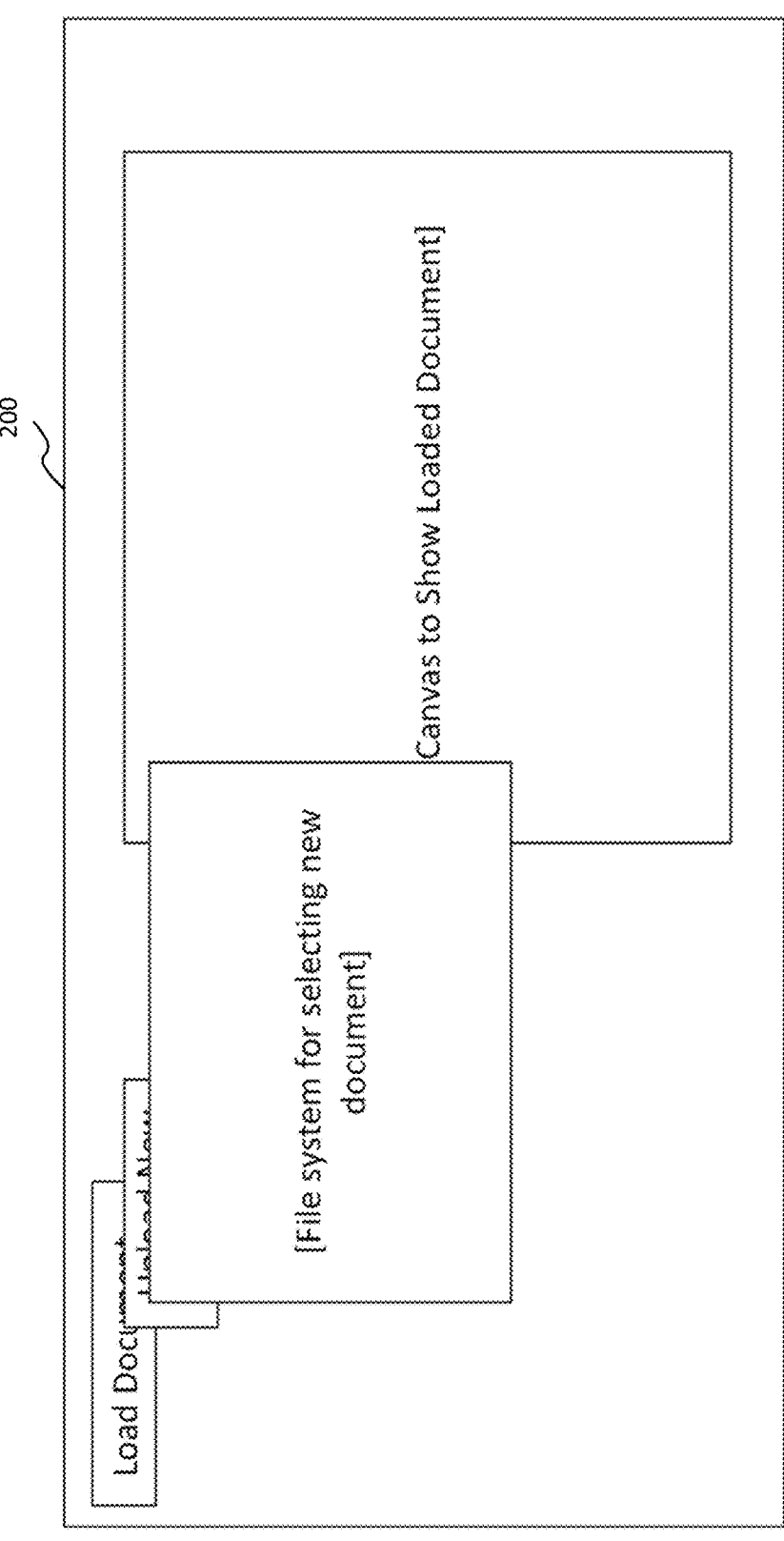
Figure 2D:
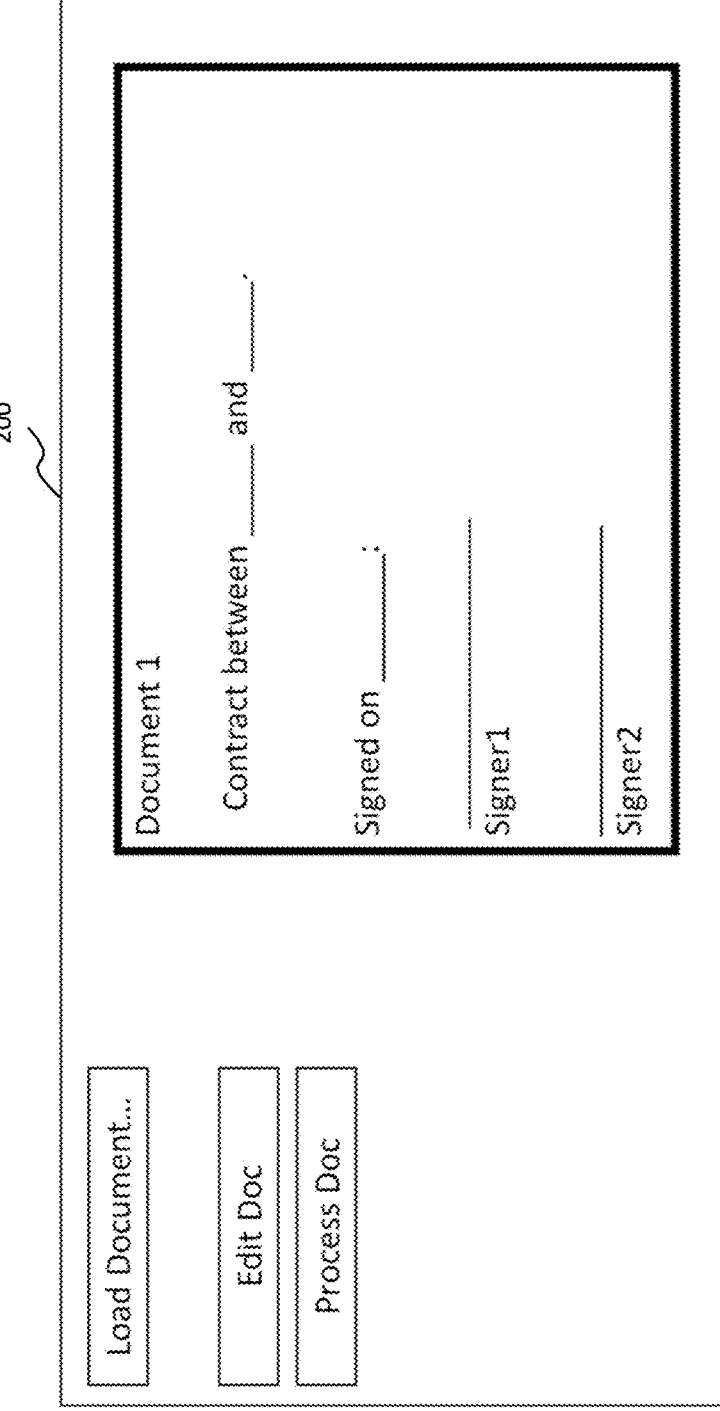
Figure 2E:
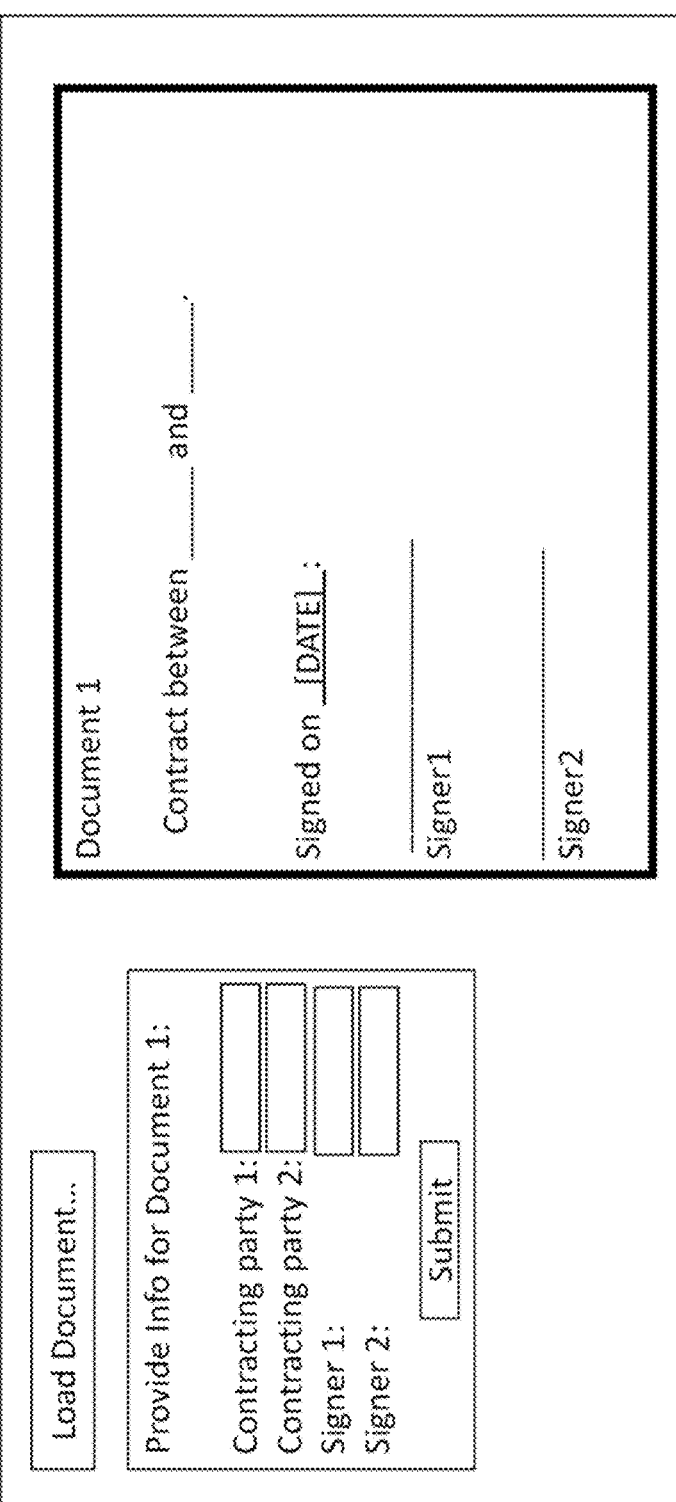

As shown in FIG. 2A, after accessing (e.g., logging into) server 110, GUI 200 may be presented to a user. The user may be presented with options to load a document, and a canvas where the loaded document may be presented. FIG. 2B shows the user selecting the option to load a document and being presented with options to upload a new document, select a template, or upload an existing document (e.g., a document in the process of being signed). In this example, the user selects the option to upload a new document. In response to selecting the option to upload a new document, the user is presented, as shown in FIG. 2C, with an option to access the local file system (e.g., from the user terminal or server 110 storage) to select a document. Upon selection of a document, the document is loaded onto the canvas of GUI 200. In embodiments, a document manager (e.g., document manager 120) may process the document and may identify the fields where information is to be added to the document (e.g., names of parties, dates, amounts, etc.) and may present the fields and the document to the user, as shown in FIG. 2D. The user may select to edit the document, which may allow the user to make changes to the document on the canvas, such as changing or adding terms to the document. The user may select to process the document, in which case a form may be presented to the user to provide information for the document, as shown in FIG. 2E. The user may provide this information to be added to the document, which may include the parties involved in the document, such as contracting parties, signing parties, etc.

Figure 2F:
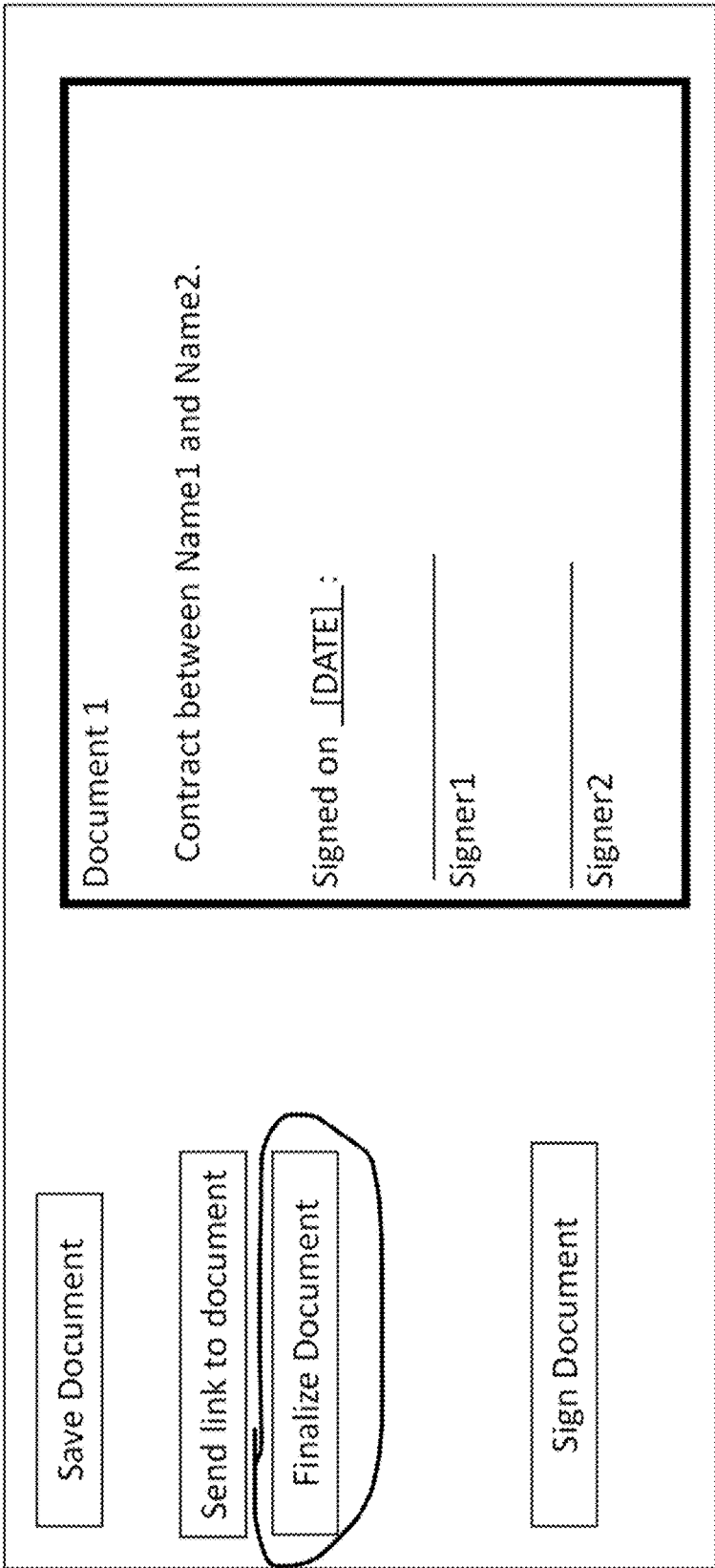

As shown in FIG. 2F, once the document is complete (e.g., may include all terms to be added to the document and is ready for signature by the signatories) as desired by current user, which may be the author, the current user can finalize the document. Alternatively, the user may save the document for further work later on. In embodiments, finalizing the document has the effect of allowing the current user to deem the document ready for signing. The current user can be the party preparing the document initially, or another one of the signers allowed to make changes. The users can go back and forth making changes until document is ready to finalize, at which point the "finalize document" option is selected and the document is finalized.

In this example, when the document is finalized, a copy of the finalized document is stored in the server (e.g., in a pre-signature folder, in a finalized document folder) or may be stored to the blockchain. In this example, a hashing manager (e.g., hashing manager 122) may generate a hash of the finalized document, and the hash may be stored to the blockchain. Once the document is finalized, other signers may be prevented from making changes to the document. This can be accomplished by checking the hash of a finalized document being signed by other signers and if the hash does not match the finalized hash, the signer will not be allowed to sign.

Figure 2G:
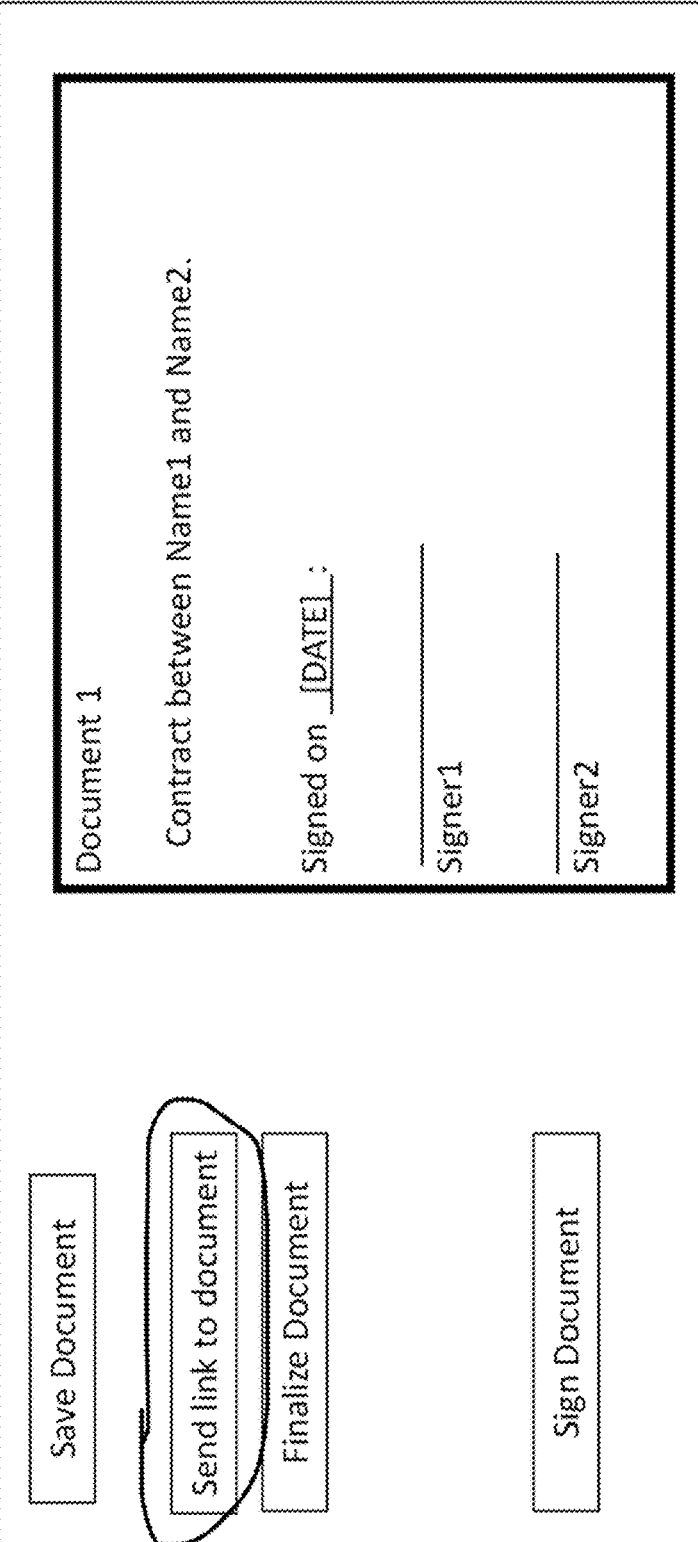
Figure 2H:
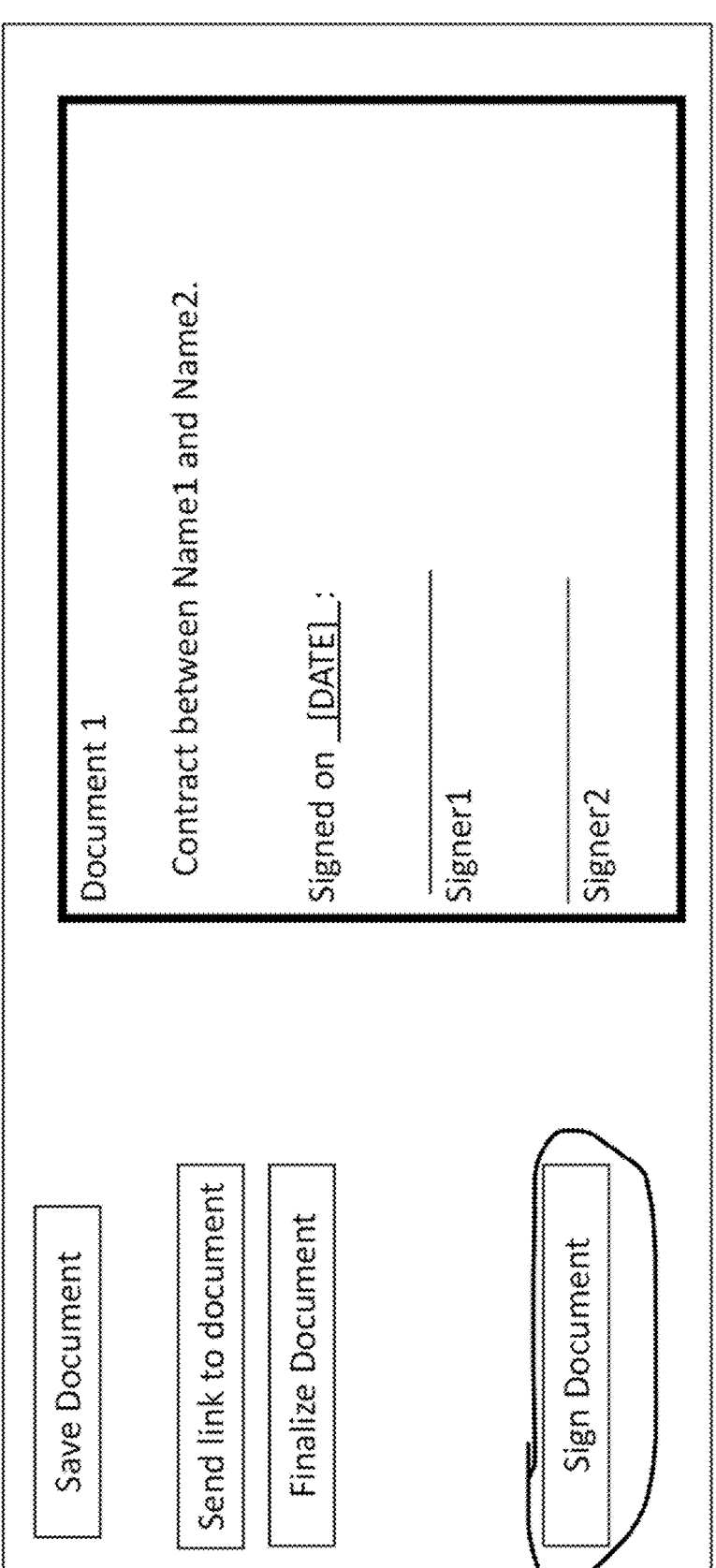

As shown in FIG. 2G, a link to the finalized document may be sent to the signatories for singing of the document. As shown in FIG. 2H, a signatory may access the document and may be presented to the option to sign the document. However, before the signatory is allowed to sign, validation checks may be performed.

Figure 2I:
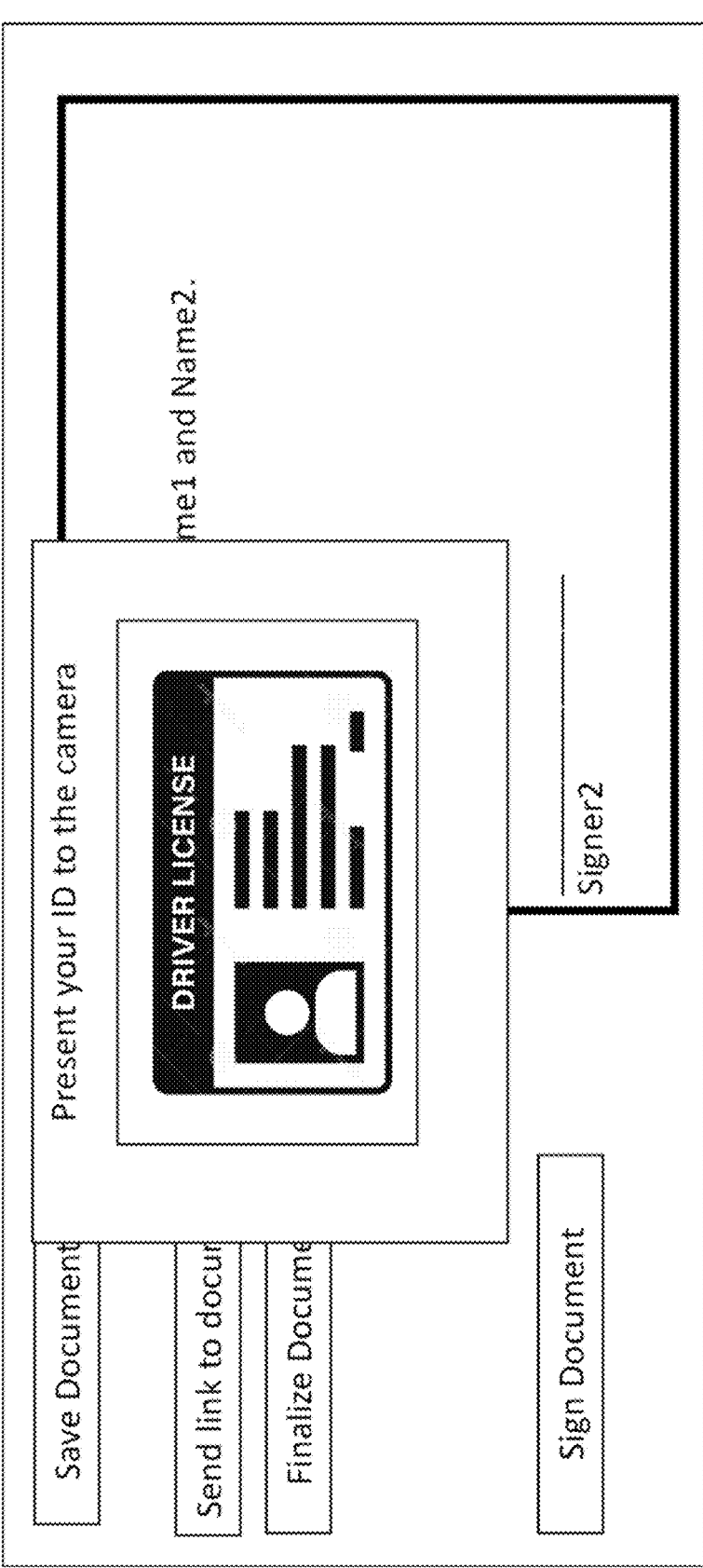
Figure 2J:
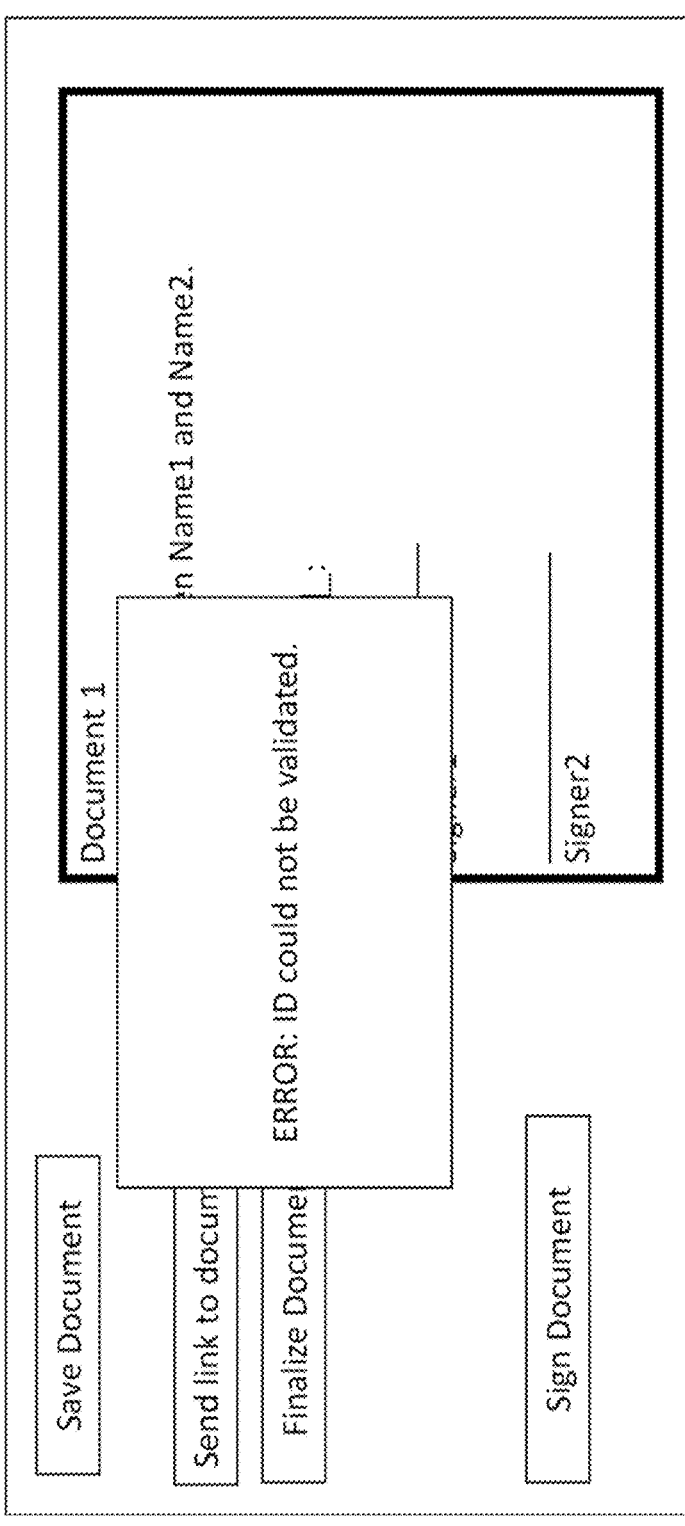

As shown in FIG. 2I, ID validation may be performed (e.g., by an ID validation manager such as ID validation manager 124). The system may request the user to indicate which signatory the user is signing for, or may assume based on the user who signed into the current session. Upon determining which signatory (e.g., signer1 or signer2) the current user is, the user terminal (e.g., the cell phone, PC, table, laptop, etc.) may activate the camera and the user may be prompted to present an identifying document to the camera. If an identifying document is not presented to the camera, the system may provide an error indicating that the ID could not be validated, as shown in FIG. 2J. If an identifying document is presented to the camera, the system may capture an image of the identifying document and may process the identifying document to identify the identifying information therein. In some embodiments, the system may validate the identifying document to determine whether the identifying document is fake or not. The system may extract the ID face, the ID name, and/or other information, and may determine whether the information matches the identity of the signatory. If the information does not match the identity of the signatory, the system may provide an error indicating that the ID could not be validated, as shown in FIG. 2J.

Figure 2K:
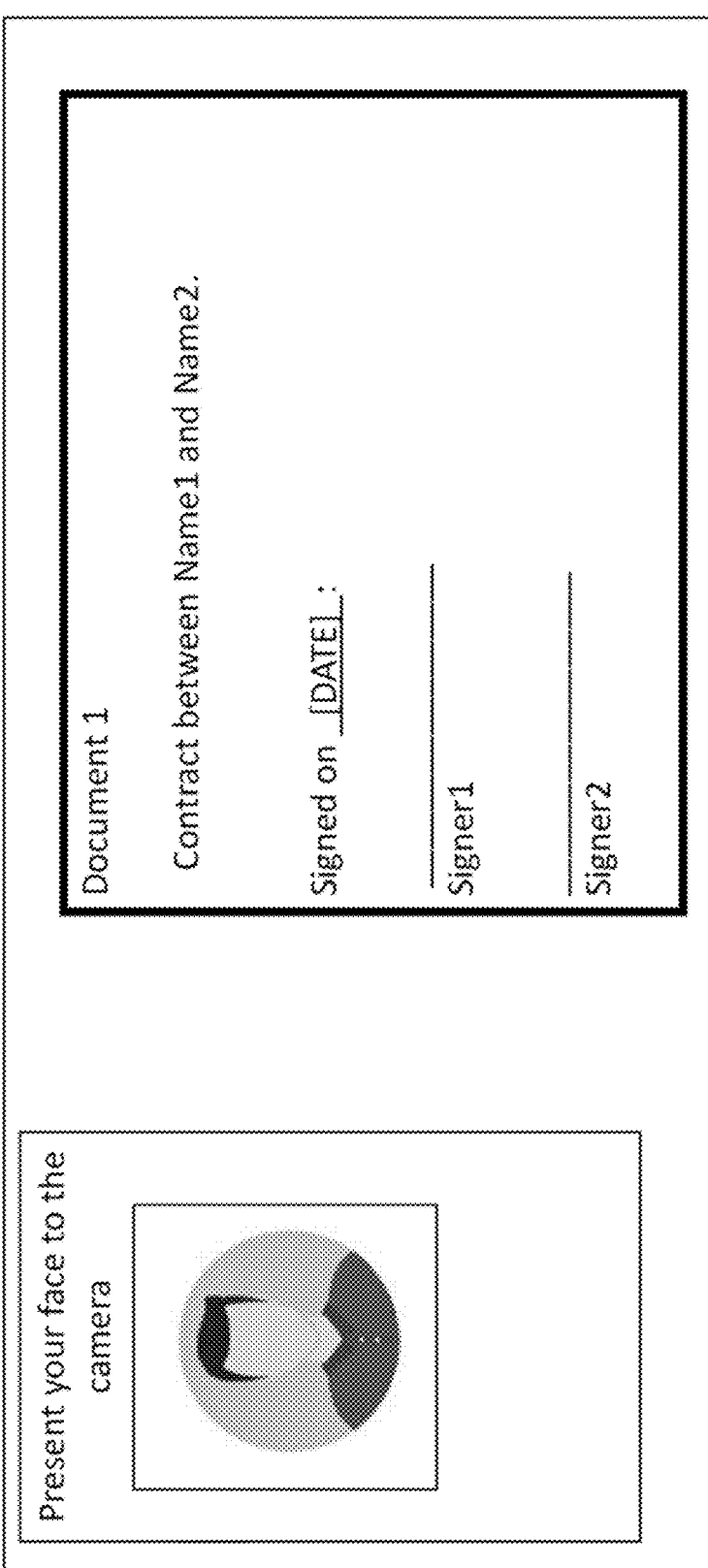

If the system determines that the information matches the identity of the signatory, the system may proceed to determine whether the user currently signing matches the identity of the signatory. For example, as shown in FIG. 2K, the user may be prompted to present their face to the camera. The camera feed may be provided to the ID validation manager, which may determine whether the face presented to the camera matches the face in the identifying document. If the face presented to the camera does not match the face in the identifying document, the user may not be allowed to select the sign document option and may receive an ID validation failure message. On the other hand, if the face presented to the camera matches the face in the identifying document, the system may proceed to allow the user to select the sign document option.

Figure 2L:
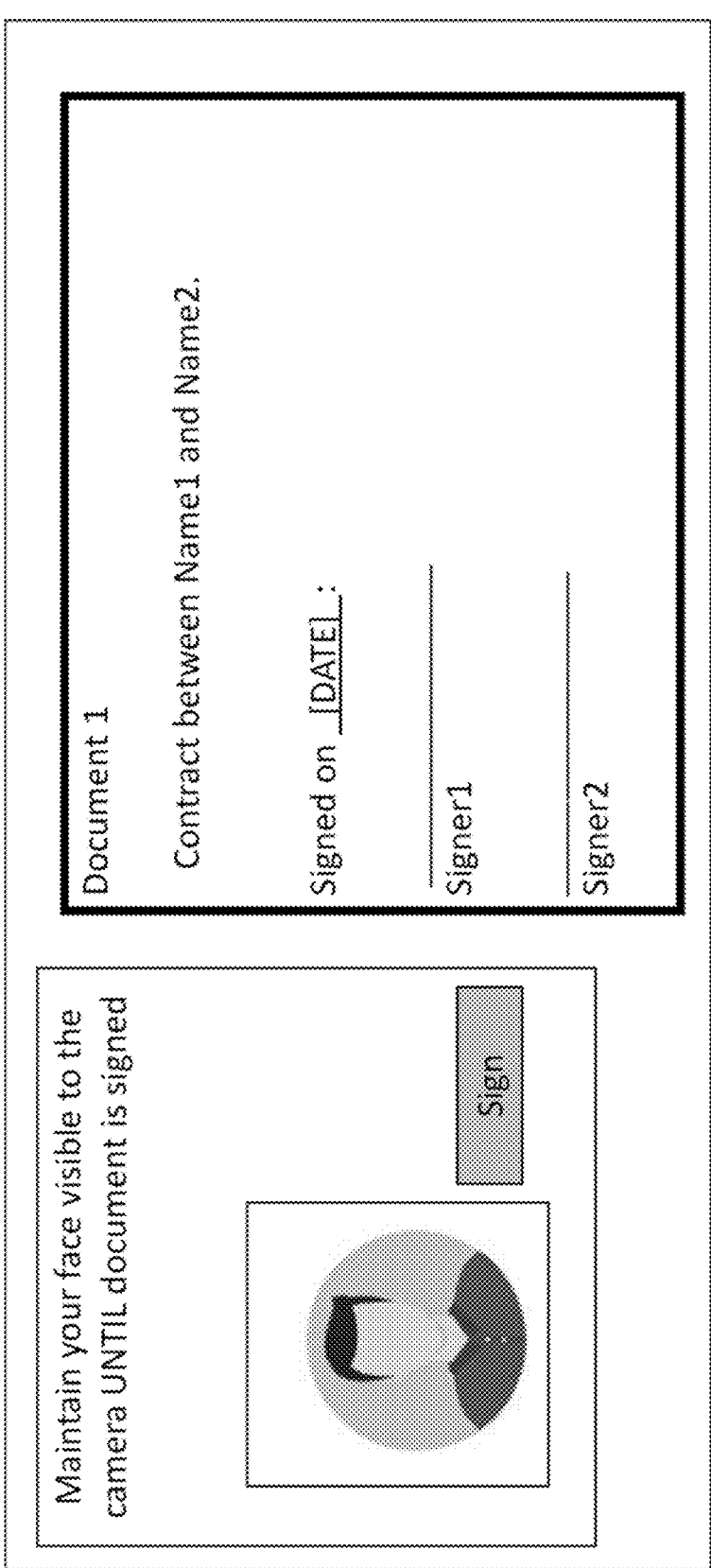

However, as shown in FIG. 2L, the user may be prompted to maintain their face visible to the camera until after the document is signed. If the camera stream is broken, or the face of the current user is not visible in the camera, or the face of the current user does not match the face of the ID face (extracted from the ID document), the signing process will be paused or aborted, and an ID validation failure message may be presented to the user. A shown in FIG. 2L, the "SIGN" button may be greyed out until the validation tests are completed successfully.

Figure 2M:
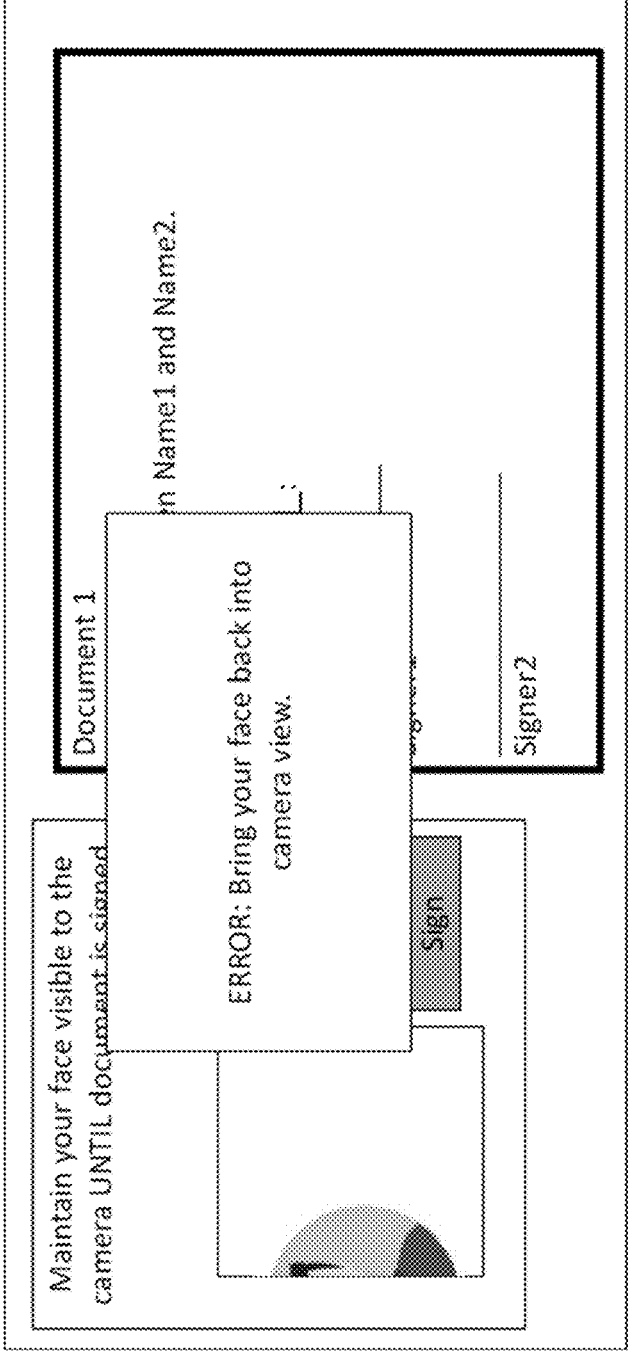
Figure 2N:
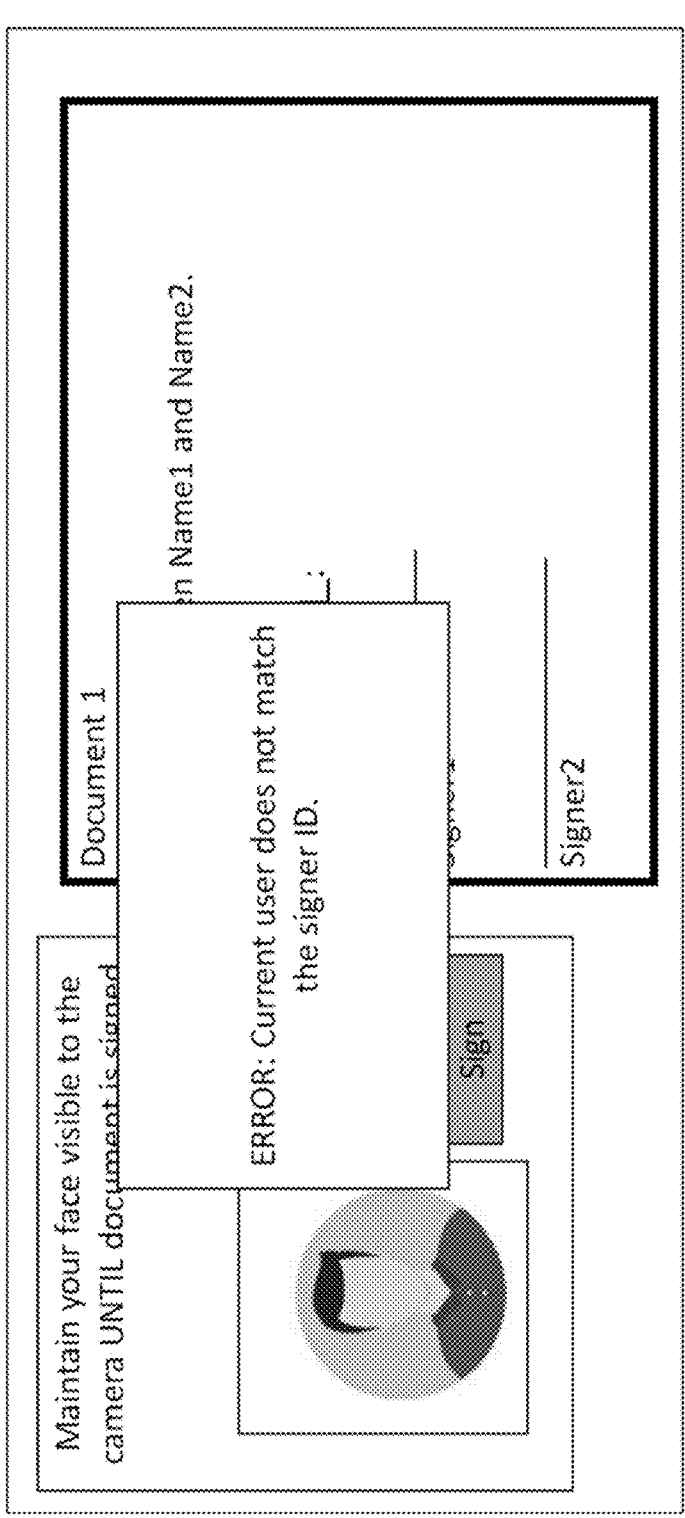
Figure 20:
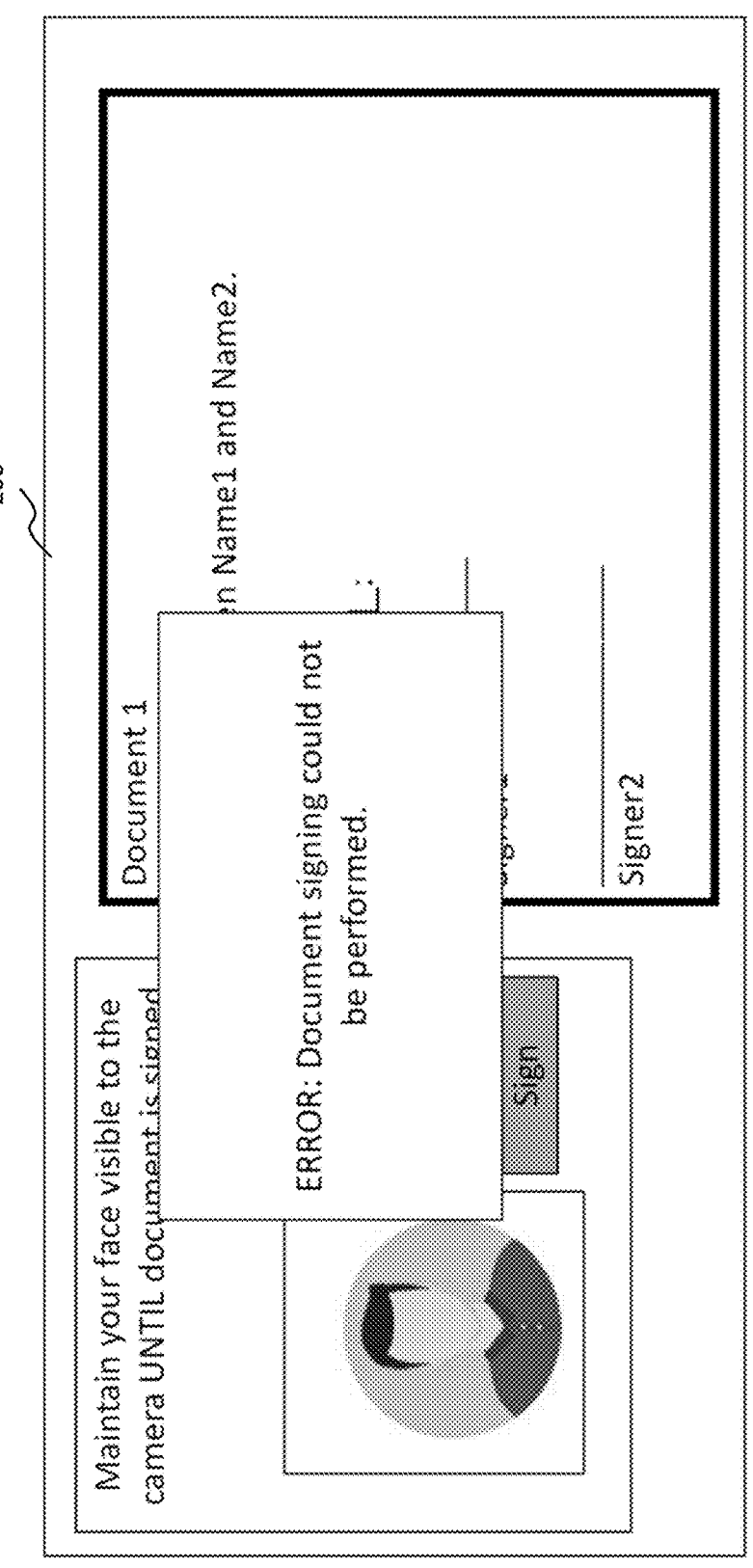

As shown in FIG. 2M, if the face of the current user is not visible in the camera, the user may receive a message prompting the user to bring their face back into camera view, and the user may not be allowed to sign until their face is visible (and validated to be the face of the signatory as indicated in the identifying document). For example, as shown in FIG. 2N, if the face of the current user as captured by the camera does not match the face of the signatory as indicated in the identifying document, the user may not be allowed to sign the document.

After ID validation is successfully performed, the system may perform competency tests. For example, as shown in FIG. 2O, the system may perform coercion or distress tests to determine whether the user is experiencing distress or coercion, as described above. In this case, an error stating that document signing could not be performed may be presented to the user. In this example, no indication may be presented of the reason of the failure in case a bad actor is present and may see the message and become aware that the system has learned that the user is being coerced. In this case, an alert may be sent to a caretaker of the signatory (without alerting the bad actor through GUI 200) to indicate of the failure.

Figure 2P:
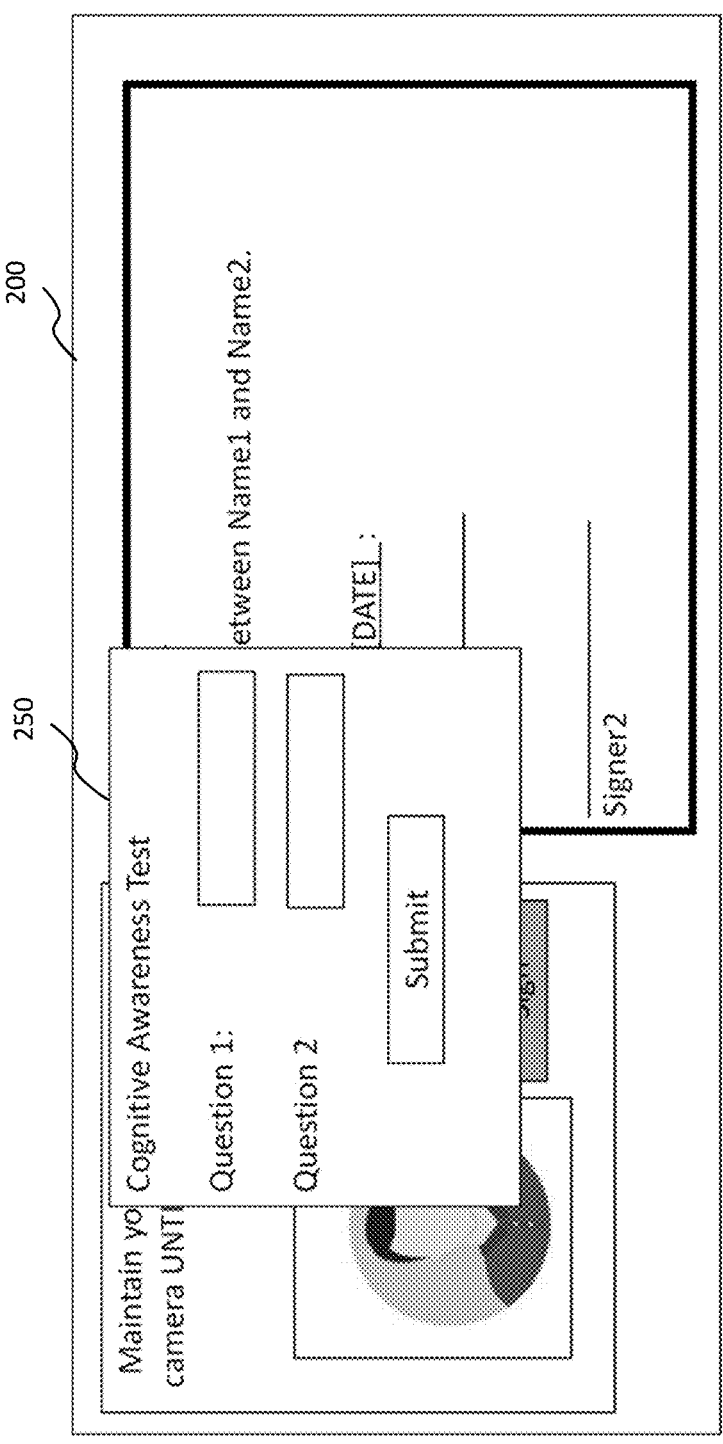
Figure 2Q:
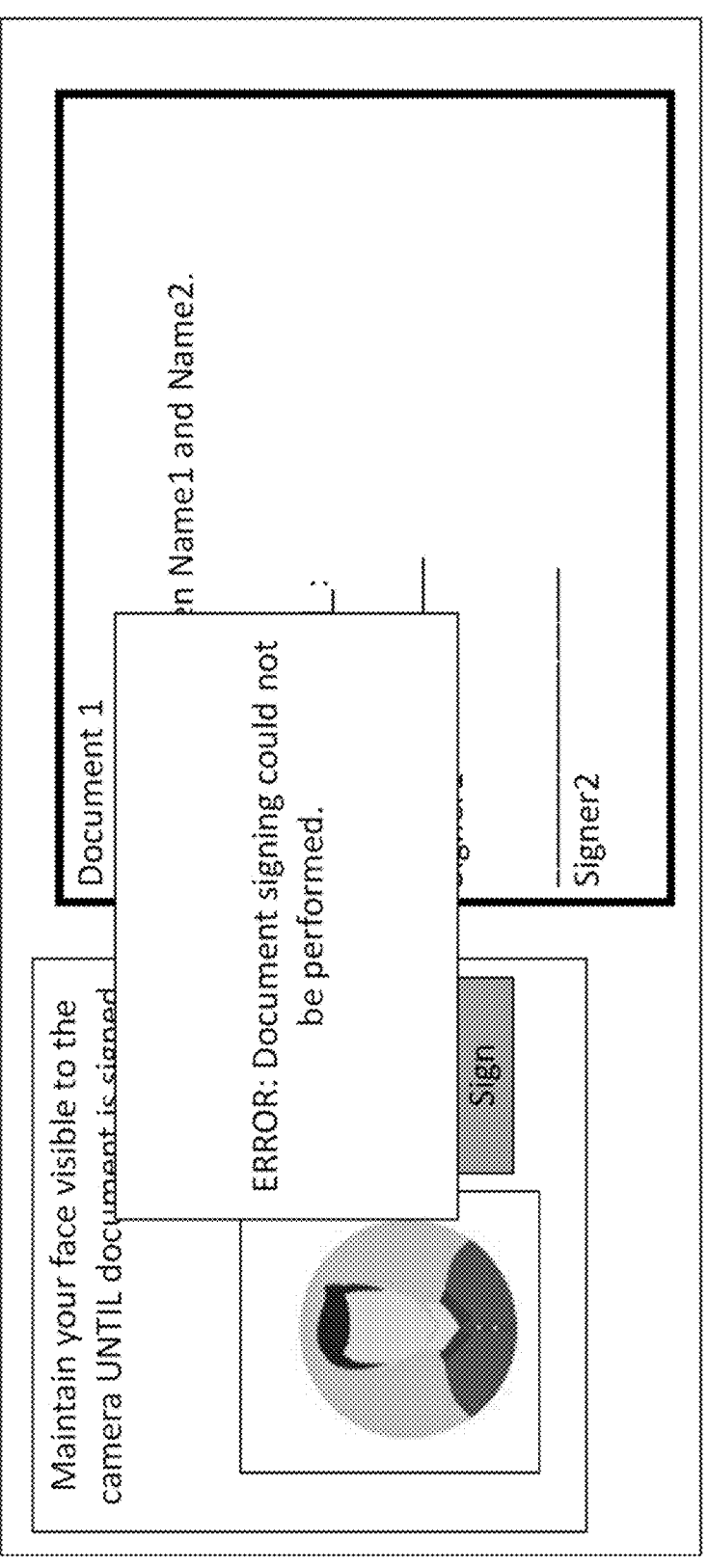
Figure 2R:
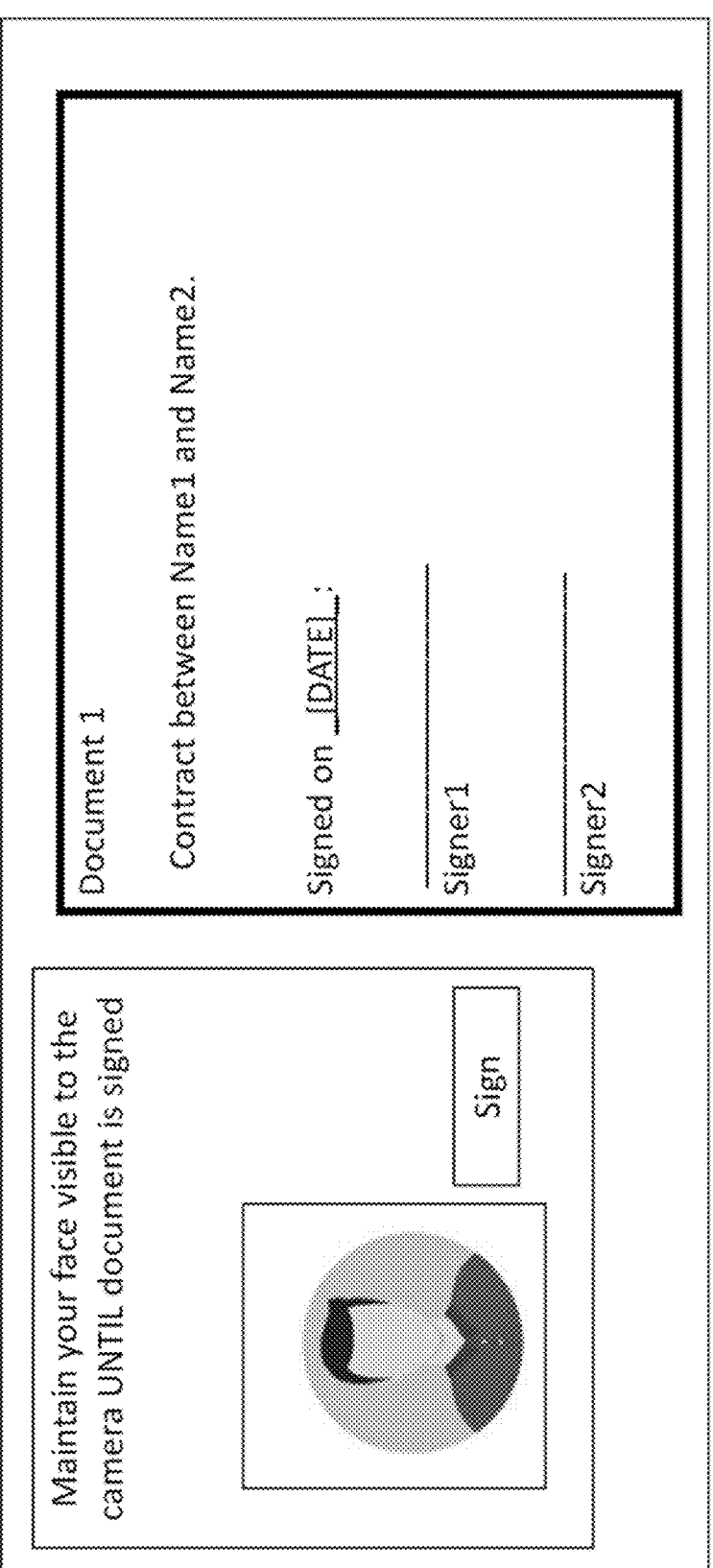

If the coercion test has passed, the system may perform a cognitive test to determine whether the user understands the terms of the document the user is signing. For example, as shown in FIG. 2P, a cognitive awareness test 250 may be presented to the user. As noted above, the form of the cognitive awareness test may vary, but may be configured to determine whether the user understands the term of the document the user is signing. In this example, the cognitive awareness test 250 may comprise some questions. The user may answer the questions and may submit them. The system (e.g., security manager 126) may determine whether the user passed the cognitive awareness test or not. If the user fails to the cognitive awareness test, a message may be presented indicating that the document signing could not be performed, as shown in FIG. 2Q. On the other hand, if the user passes to the cognitive awareness test, the user may be allowed to provide the digital signature. For example, as shown in FIG. 2R, the "SIGN" button may be no longer greyed out and may be selectable by the user to sign, as long as the user's face is still within the camera's view.

Figure 2S:
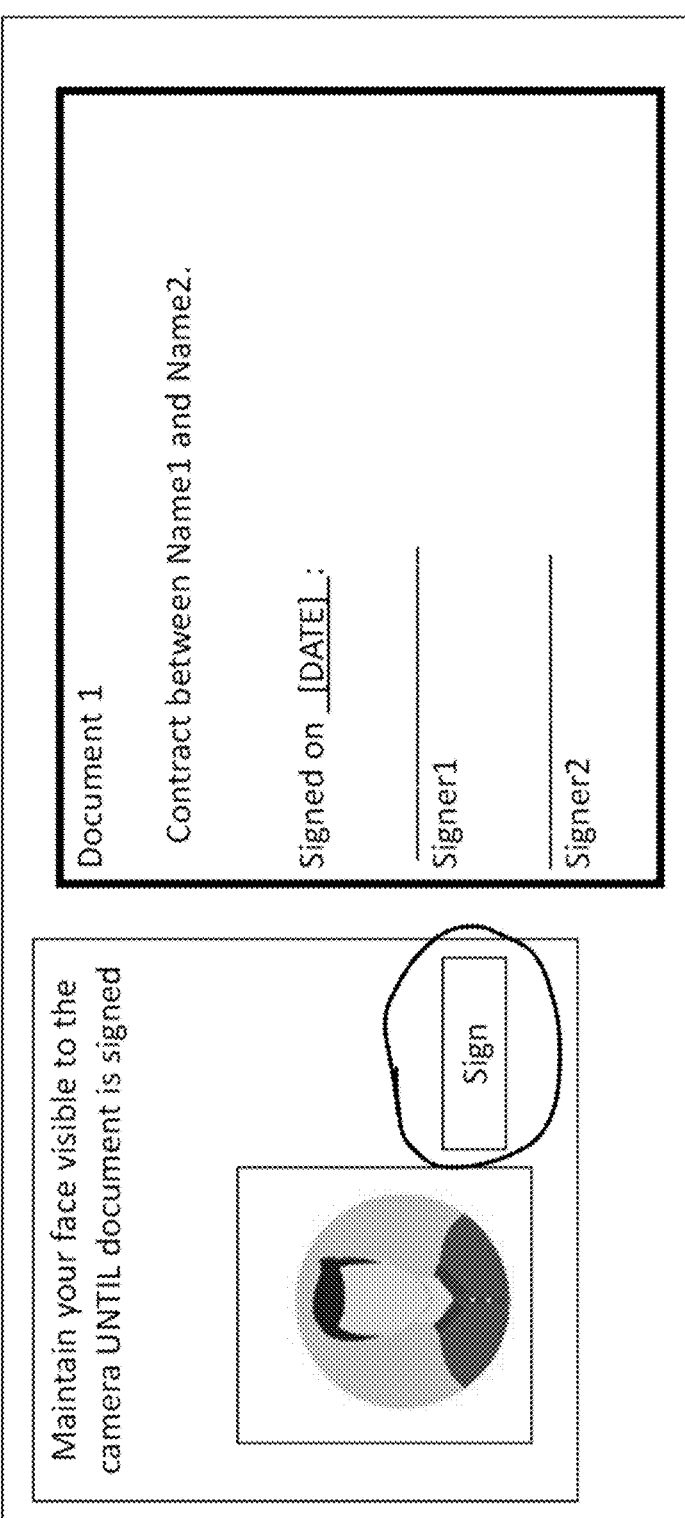
Figure 2T:
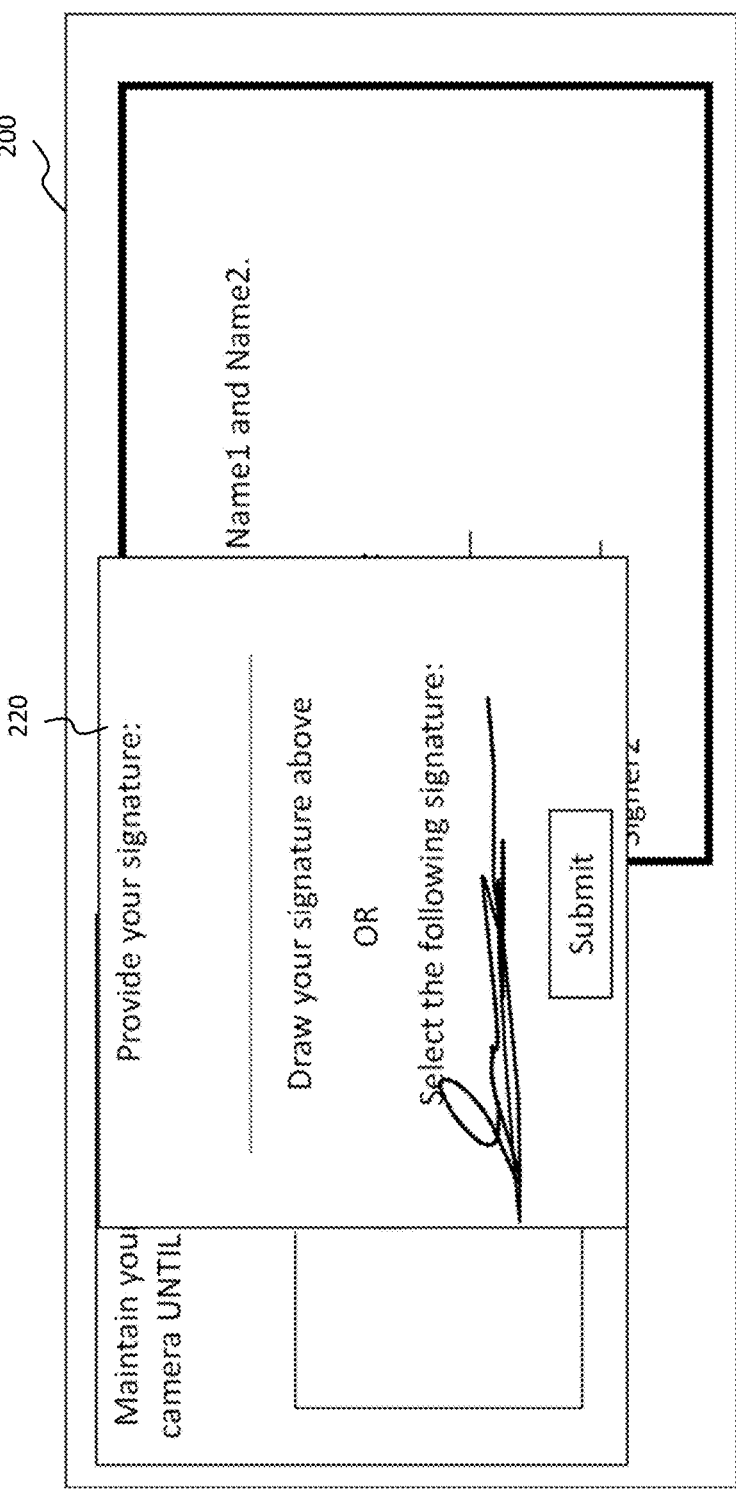
Figure 2U:
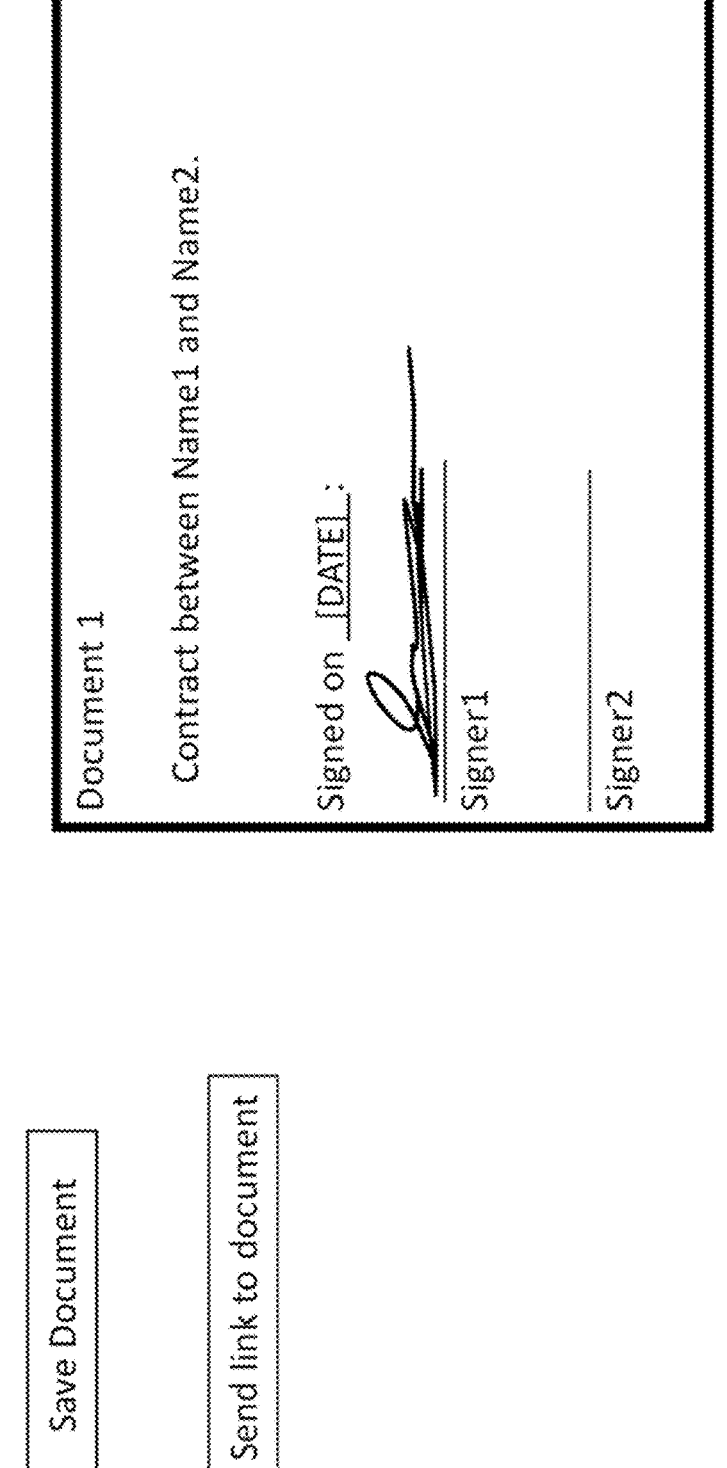

As shown in FIG. 2S, the user may select the "SIGN" option. In some embodiments, the act of selecting the SIGN button may be determined to be a signature (e.g., an act of acceptance of the terms of the document) and a digital signature object may be generated (e.g., by signature manager 121) and stored in the blockchain as belong to the document. In some embodiments, selecting the SIGN button may present a popup, such as popup 220 in FIG. T, allowing the user to provide a graphical representation of their signature (or select one) and submit it as the digital signature. As shown in FIG. 2U, the document may be considered as sign by the user (e.g., signer 1 in this case). In this example, a hash of the signed document, and of the signature object generated, may be stored in the blockchain.

Figure 2V:
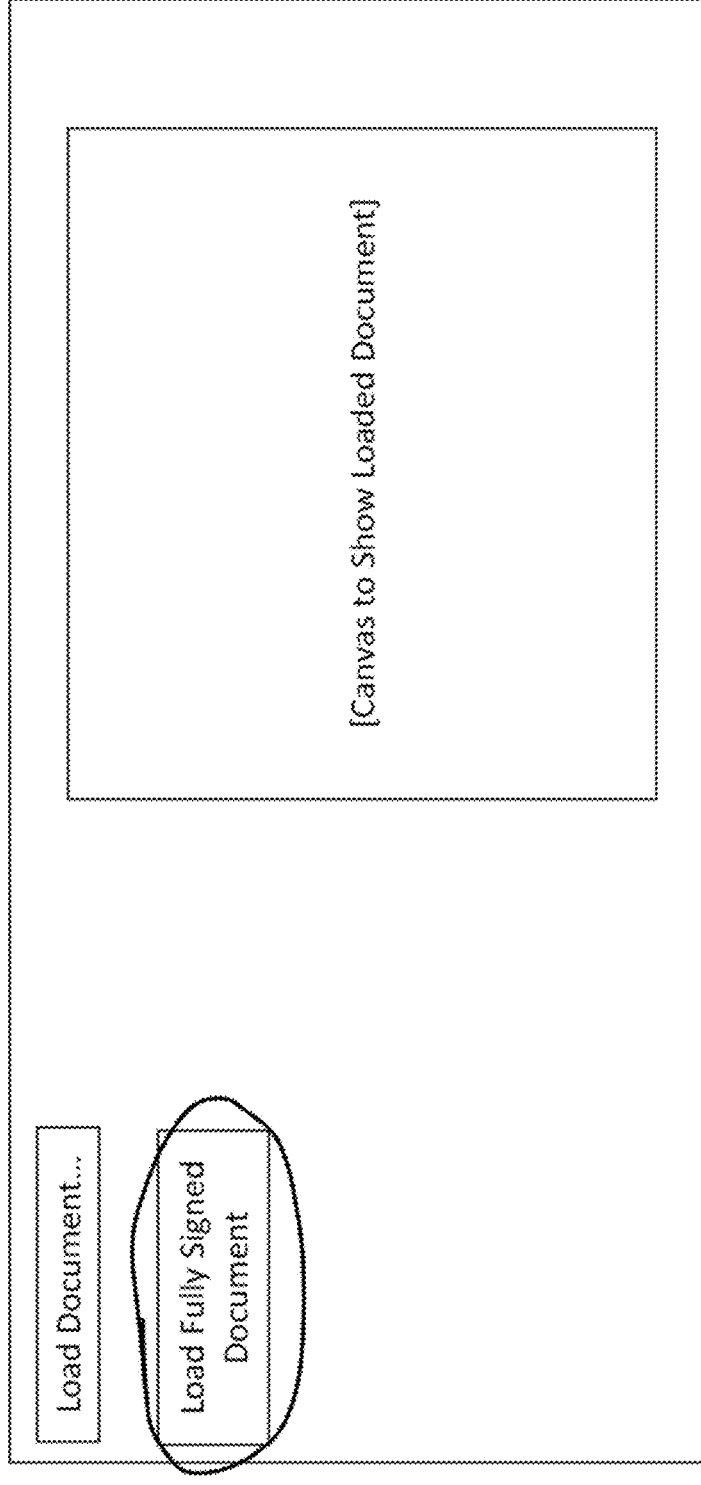
Figure 2W:
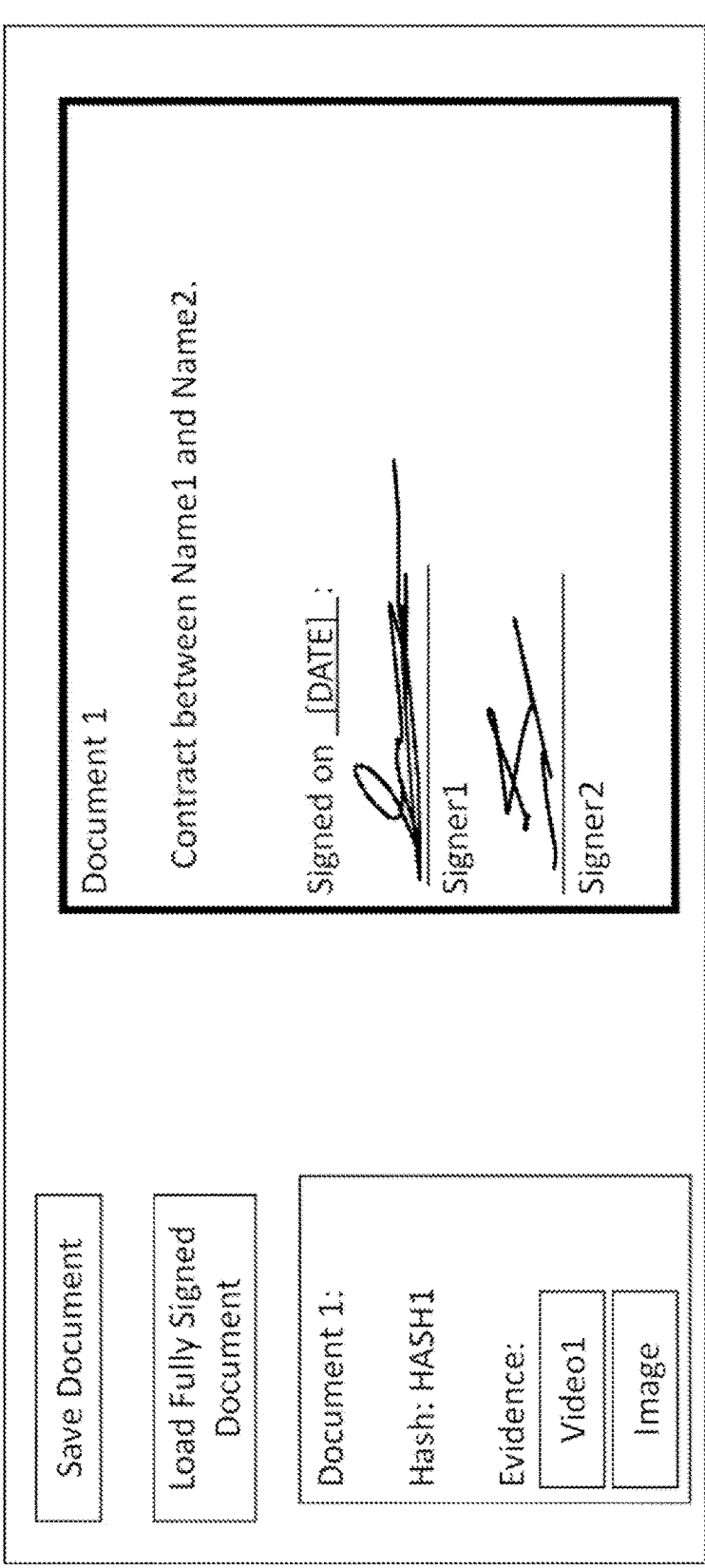
Figure 2X:
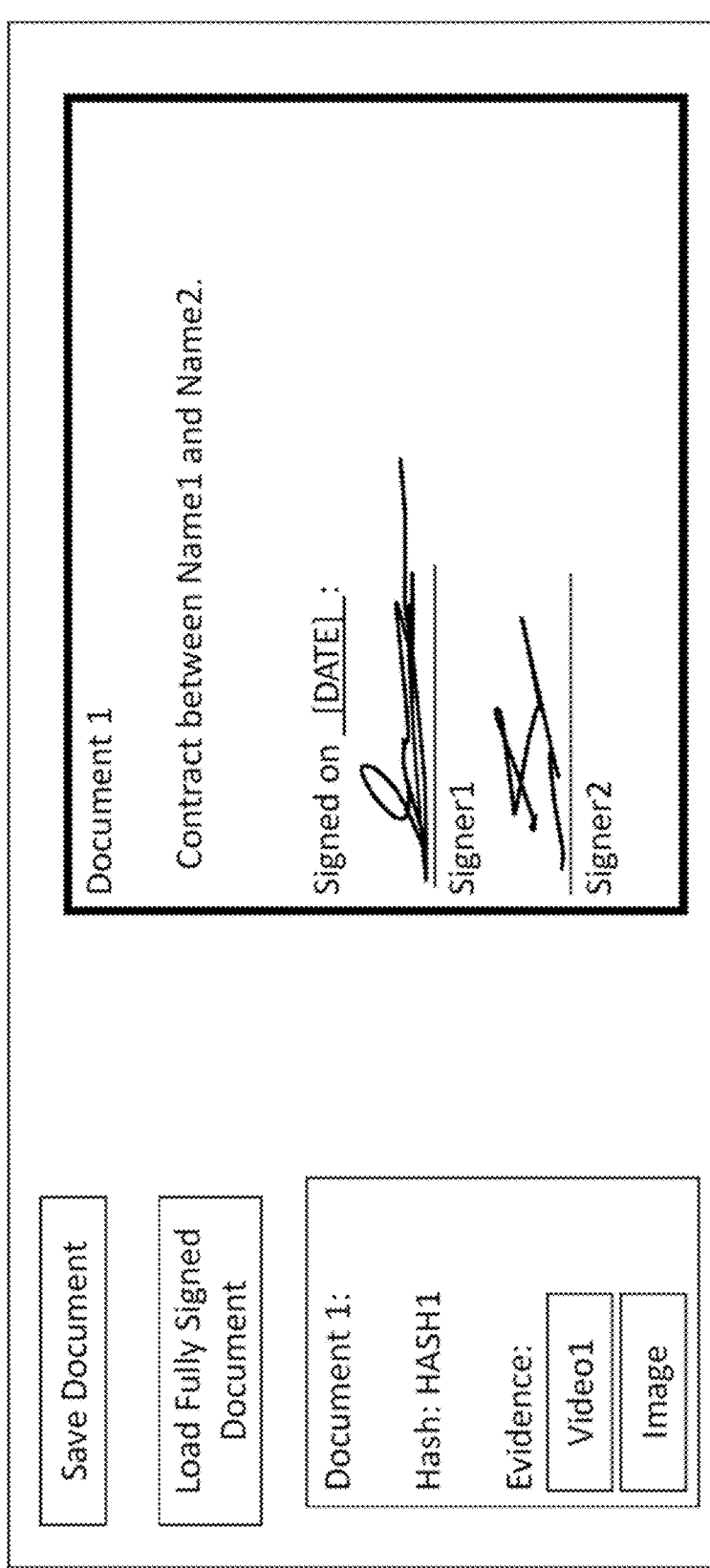

FIG. 2V shows an example where a user may select an option to load a previously fully signed document. In this case, a signed document may be presented to the user, with an indication of the hash of the signed document, and in some embodiments an option to access screen captures of the signing process (e.g., the face of the signer and the entry of the digital signature) for evidence.

FIG. 3 shows a high-level flow diagram 300 of operation of a system configured for providing functionality for validating and confirming the integrity of documents and for validating identity related to the documents based on AI and/or blockchain systems in accordance with embodiments of the present disclosure. For example, the functions illustrated in the example blocks shown in FIG. 3 may be performed by system 100 of FIG. 1 according to embodiments herein. In embodiments, the operations of the method 300 may be stored as instructions that, when executed by one or more processors, cause the one or more processors to perform the operations of the method 300.

At block 302, a document to be signed by one or more signatories is retrieved. In embodiments, the document defines one or more terms, and signing the document by the one or more signatories includes providing an indication of acceptance of the one or more terms of the document. In embodiments, functionality of a document manager (e.g., document manager 120 as illustrated in FIG. 1) may be used to retrieve a document to be signed by one or more signatories, the document defining one or more terms. In embodiments, the document manager may perform operations to retrieve a document to be signed by one or more signatories, the document defining one or more terms according to operations and functionality as described above with reference to document manager 120 and as illustrated in FIGS. 1-3.

At block 304, a request, by a user, to digitally sign the document for a signatory of the one or more signatories is received. In embodiments, digitally signing the document includes providing a digital signature representing the indication of acceptance of the one or more terms of the document by the signatory. In embodiments, functionality of a signature manager (e.g., signature manager 121 as illustrated in FIG. 1) may be used to receive a request, by a user, to digitally sign the document for a signatory of the one or more signatories. In embodiments, the signature manager may perform operations to receive a request, by a user, to digitally sign the document for a signatory of the one or more signatories according to operations and functionality as described above with reference to signature manager 121 and as illustrated in FIGS. 1-3.

At block 306, an identity of the user is validated against an identity of the signatory to determine whether the identity of the user is valid to digitally sign the document. In embodiments, functionality of an ID validation manager (e.g., ID validation manager 124 as illustrated in FIG. 1) may be used to validate an identity of the user against an identity of the signatory to determine whether the identity of the user is valid to digitally sign the document. In embodiments, the ID validation manager may perform operations to validate an identity of the user against an identity of the signatory to determine whether the identity of the user is valid to digitally sign the document according to operations and functionality as described above with reference to ID validation manager 124 and as illustrated in FIGS. 1-3.

At block 308, the document is verified to determine whether the document has been altered. In embodiments, functionality of a document verification manager (e.g., document verification manager 125 as illustrated in FIG. 1) may be used to verify the document to determine whether the document has been altered. In embodiments, the document verification manager may perform operations to verify the document to determine whether the document has been altered according to operations and functionality as described above with reference to document verification manager 125 and as illustrated in FIGS. 1-3.

At block 310, whether the user is competent to digitally sign the document is determined. In embodiments, functionality of a security manager (e.g., security manager 126 as illustrated in FIG. 1) may be used to determine whether the user is competent to digitally sign the document. In embodiments, the security manager may perform operations to determine whether the user is competent to digitally sign the document according to operations and functionality as described above with reference to security manager 126 and as illustrated in FIGS. 1-3.

At block 312, the user is allowed to digitally sign the document for the signatory in response to a determination that the identity of the user is valid to digitally sign the document, that the document has not been altered, and that the user is competent to digitally sign the document. In embodiments, functionality of a signature manager (e.g., signature manager 121 as illustrated in FIG. 1) may be used to allow the user to digitally sign the document for the signatory in response to a determination that the identity of the user is valid to digitally sign the document, that the document has not been altered, and that the user is competent to digitally sign the document. In embodiments, the signature manager may perform operations to allow the user to digitally sign the document for the signatory in response to a determination that the identity of the user is valid to digitally sign the document, that the document has not been altered, and that the user is competent to digitally sign the document according to operations and functionality as described above with reference to signature manager 121 and as illustrated in FIGS. 1-3.

At block 314, the user is prevented from digitally signing the document for the signatory in response to a determination that one or more of: the identity of the user is invalid to digitally sign the document, the document has been altered, and that the user is not competent to digitally sign the document. In embodiments, functionality of a signature manager (e.g., signature manager 121 as illustrated in FIG. 1) may be used to prevent the user from digitally signing the document for the signatory in response to a determination that one or more of: the identity of the user is invalid to digitally sign the document, the document has been altered, and that the user is not competent to digitally sign the document. In embodiments, the signature manager may perform operations to prevent the user from digitally signing the document for the signatory in response to a determination that one or more of: the identity of the user is invalid to digitally sign the document, the document has been altered, and that the user is not competent to digitally sign the document according to operations and functionality as described above with reference to signature manager 121 and as illustrated in FIGS. 1-3.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosure can be established by the appended claims. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various embodiments of the present disclosure may be combined or performed in ways other than those illustrated and described herein.

Functional blocks and modules in FIGS. 1-3 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method of securely digitally signing a document, the method comprising:

retrieving the document to be signed by one or more signatories, the document defining one or more terms, wherein signing the document by the one or more signatories includes providing an indication of acceptance of the one or more terms of the document;

receiving a request, by a user, to digitally sign the document for a signatory of the one or more signatories, wherein digitally signing the document includes providing a digital signature representing the indication of acceptance of the one or more terms of the document by the signatory;

validating an identity of the user against an identity of the signatory to determine whether the identity of the user is valid to digitally sign the document;

verifying the document to determine whether the document has been altered;

determining whether the user is competent to digitally sign the document, wherein determining whether the user is competent to digitally sign the document includes:

capturing, using a camera of a user terminal, an image stream representing the user;

determining, based on the image stream representing the user, using one or more models, whether the user is in distress or under coercion;

determining that the user is not competent to digitally sign the document in response to a determination that the user is in distress or under coercion; and determining that the user is competent to digitally sign the document in response to a determination that the user is not in distress or under coercion;

allowing the user to digitally sign the document for the signatory in response to a determination that the identity of the user is valid to digitally sign the document, that the document has not been altered, and that the user is competent to digitally sign the document; and preventing the user from digitally signing the document for the signatory in response to a determination that one or more of: the identity of the user is invalid to digitally sign the document, the document has been altered, and that the user is not competent to digitally sign the document, wherein preventing the user from digitally signing the document for the signatory includes:

automatically sending a control signal to a signature manager to block application of the digital signature representing the indication of acceptance of the one or more terms of the document by the signatory to the document.

2. The method of claim 1, wherein validating the identity of the user against the identity of the signatory to determine whether the identity of the user is valid to digitally sign the document includes:

determining the identity of the user;

determining the identity of the signatory;

comparing the identity of the user against the identity of the signatory to determine whether the identity of the user matches the identity of the signatory;

determining that the identity of the user is valid to digitally sign the document in response to a determination that the identity of the user matches the identity of the signatory; and determining that the identity of the user is not valid to digitally sign the document in response to a determination that the identity of the user does not match the identity of the signatory.

3. The method of claim 2, wherein determining the identity of the user includes:

activating a camera of a user terminal to capture an image of the user;

prompting the user to present an identifying document to the camera;

capturing an image of the identifying document using the camera;

extracting the identity of the user from the image of the identifying document.

4. The method of claim 3, wherein determining whether the identity of the user is valid to digitally sign the document includes:

capturing, using the camera, a photograph of the user; and comparing the photograph of the user against a known image of the signatory to determine whether the photograph of the user matches the image of the signatory.

5. The method of claim 3, wherein determining whether the identity of the user is valid to digitally sign the document includes:

capturing the user's face within view of the camera;

determining whether the user's face is visible to the camera; and preventing the user from digitally signing the document for the signatory in response to a determination that the user's face is not visible to the camera.

6. The method of claim 1, wherein verifying the document to determine whether the document has been altered includes:

retrieving a first hash associated with the document from a blockchain;

obtaining a second hash of the document as presented to the user for signing;

determining whether the first hash and the second hash match;

determining that the document has been altered in response to a determination that the first hash and the second hash do not match; and determining that the document has not been altered in response to a determination that the first hash and the second hash match.

7. The method of claim 1, further comprising:

generating, in response to a determination that the user is in distress or under coercion, an alert indicating that the user is in distress or under coercion; and sending the alert to a caretaker associated with the user.

8. The method of claim 1, wherein determining whether the user is competent to digitally sign the document includes:

generating, based on the document to be signed, a cognitive awareness test configured to determine whether the user understands the one or more terms defined in the document;

presenting the cognitive awareness test to the user;

receiving a response to the cognitive awareness test from the user;

determining, based on the response to the cognitive awareness test, whether the user has passed or failed the cognitive awareness test;

determining that the user is not competent to digitally sign the document in response to a determination that the user has failed the cognitive awareness test; and determining that the user is competent to digitally sign the document in response to a determination that the user has passed the cognitive awareness test.

9. The method of claim 8, further comprising:

generating, in response to a determination that the user has failed the cognitive awareness test, an alert indicating that the user has failed the cognitive awareness test; and sending the alert to a caretaker associated with the user.

10. A system configured to securely digitally sign a document, comprising:

at least one processor; and a memory operably coupled to the at least one processor and storing processor-readable code that, when executed by the at least one processor, is configured to perform operations including:

retrieving the document to be signed by one or more signatories, the document defining one or more terms, wherein signing the document by the one or more signatories includes providing an indication of acceptance of the one or more terms of the document;

receiving a request, by a user, to digitally sign the document for a signatory of the one or more signatories, wherein digitally signing the document includes providing a digital signature representing the indication of acceptance of the one or more terms of the document by the signatory;

validating an identity of the user against an identity of the signatory to determine whether the identity of the user is valid to digitally sign the document;

verifying the document to determine whether the document has been altered;

determining whether the user is competent to digitally sign the document, wherein determining whether the user is competent to digitally sign the document includes:

capturing, using a camera of a user terminal, an image stream representing the user;

determining, based on the image stream representing the user, using one or more models, whether the user is in distress or under coercion;

determining that the user is not competent to digitally sign the document in response to a determination that the user is in distress or under coercion; and determining that the user is competent to digitally sign the document in response to a determination that the user is not in distress or under coercion;

allowing the user to digitally sign the document for the signatory in response to a determination that the identity of the user is valid to digitally sign the document, that the document has not been altered, and that the user is competent to digitally sign the document; and preventing the user from digitally signing the document for the signatory in response to a determination that one or more of: the identity of the user is invalid to digitally sign the document, the document has been altered, and that the user is not competent to digitally sign the document, wherein preventing the user from digitally signing the document for the signatory includes:

automatically sending a control signal to a signature manager to block application of the digital signature representing the indication of acceptance of the one or more terms of the document by the signatory to the document.

11. The system of claim 10, wherein validating the identity of the user against the identity of the signatory to determine whether the identity of the user is valid to digitally sign the document includes:

determining the identity of the user;

determining the identity of the signatory;

comparing the identity of the user against the identity of the signatory to determine whether the identity of the user matches the identity of the signatory;

determining that the identity of the user is valid to digitally sign the document in response to a determination that the identity of the user matches the identity of the signatory; and determining that the identity of the user is not valid to digitally sign the document in response to a determination that the identity of the user does not match the identity of the signatory.

12. The system of claim 11, wherein determining the identity of the user includes:

activating a camera of a user terminal to capture an image of the user;

prompting the user to present an identifying document to the camera;

capturing an image of the identifying document using the camera;

extracting the identity of the user from the image of the identifying document.

13. The system of claim 12, wherein determining whether the identity of the user is valid to digitally sign the document includes:

capturing, using the camera, a photograph of the user; and comparing the photograph of the user against a known image of the signatory to determine whether the photograph of the user matches the image of the signatory.

14. The system of claim 12, wherein determining whether the identity of the user is valid to digitally sign the document includes:

capturing the user's face within view of the camera;

determining whether the user's face is visible to the camera; and preventing the user from digitally signing the document for the signatory in response to a determination that the user's face is not visible to the camera.

15. The system of claim 10, wherein verifying the document to determine whether the document has been altered includes:

retrieving a first hash associated with the document from a blockchain;

obtaining a second hash of the document as presented to the user for signing;

determining whether the first hash and the second hash match;

determining that the document has been altered in response to a determination that the first hash and the second hash do not match; and determining that the document has not been altered in response to a determination that the first hash and the second hash match.

16. The system of claim 10, wherein the operations further comprise:

generating, in response to a determination that the user is in distress or under coercion, an alert indicating that the user is in distress or under coercion; and sending the alert to a caretaker associated with the user.

17. The system of claim 10, wherein determining whether the user is competent to digitally sign the document includes:

generating, based on the document to be signed, a cognitive awareness test configured to determine whether the user understands the one or more terms defined in the document;

presenting the cognitive awareness test to the user;

receiving a response to the cognitive awareness test from the user;

determining, based on the response to the cognitive awareness test, whether the user has passed or failed the cognitive awareness test;

determining that the user is not competent to digitally sign the document in response to a determination that the user has failed the cognitive awareness test; and determining that the user is competent to digitally sign the document in response to a determination that the user has passed the cognitive awareness test.

18. A computer-based product for securely digitally signing a document, the computer-based product including non-transitory computer readable media having stored thereon computer code which, when executed by a processor, causes a computing device to perform operations comprising:

retrieving the document to be signed by one or more signatories, the document defining one or more terms, wherein signing the document by the one or more signatories includes providing an indication of acceptance of the one or more terms of the document;

receiving a request, by a user, to digitally sign the document for a signatory of the one or more signatories, wherein digitally signing the document includes providing a digital signature representing the indication of acceptance of the one or more terms of the document by the signatory;

validating an identity of the user against an identity of the signatory to determine whether the identity of the user is valid to digitally sign the document;

verifying the document to determine whether the document has been altered;

determining whether the user is competent to digitally sign the document, wherein determining whether the user is competent to digitally sign the document includes:

capturing, using a camera of a user terminal, an image stream representing the user, determining, based on the image stream representing the user, using one or more models, whether the user is in distress or under coercion;

determining that the user is not competent to digitally sign the document in response to a determination that the user is in distress or under coercion; and determining that the user is competent to digitally sign the document in response to a determination that the user is not in distress or under coercion;

allowing the user to digitally sign the document for the signatory in response to a determination that the identity of the user is valid to digitally sign the document, that the document has not been altered, and that the user is competent to digitally sign the document; and preventing the user from digitally signing the document for the signatory in response to a determination that one or more of: the identity of the user is invalid to digitally sign the document, the document has been altered, and that the user is not competent to digitally sign the document, wherein preventing the user from digitally signing the document for the signatory includes:

automatically sending a control signal to a signature manager to block application of the digital signature representing the indication of acceptance of the one or more terms of the document by the signatory to the document.

* * * * *